US012706372B2

(12) United States Patent
Kim et al.

(10) Patent No.: US 12,706,372 B2
(45) Date of Patent: Aug. 11, 2026

(54) ANTENNA AND ELECTRONIC APPARATUS INCLUDING SAME

(71) Applicant: SAMSUNG ELECTRONICS CO., LTD., Suwon-si (KR)

(72) Inventors: Junwoo Kim, Suwon-si (KR); Himchan Yun, Suwon-si (KR); Cheolhong Son, Suwon-si (KR); Sangha Lee, Suwon-si (KR); Soonho Hwang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 353 days.

(21) Appl. No.: 18/451,840

(22) Filed: Aug. 18, 2023

(65) Prior Publication Data

US 2023/0395970 A1 Dec. 7, 2023

Related U.S. Application Data

(63) Continuation of application No. PCT/KR2022/002248, filed on Feb. 16, 2022.

(30) Foreign Application Priority Data

Feb. 18, 2021 (KR) ........................ 10-2021-0022056

(51) Int. Cl.
*H01Q 1/24* (2006.01)
*H04M 1/02* (2006.01)

(52) U.S. Cl.
CPC ............ *H01Q 1/243* (2013.01); *H04M 1/026* (2013.01)

(58) Field of Classification Search
CPC ........ H01Q 1/243; H01Q 1/2291; H01Q 9/42; H01Q 1/24; H01Q 1/46; H04M 1/026; H04M 1/0214; H04M 1/0249; G09F 9/301
See application file for complete search history.

(56) References Cited

U.S. PATENT DOCUMENTS 9,496,608 B2 11/2016 Jiang et al.
9,728,854 B2 8/2017 Kim et al.
(Continued)

FOREIGN PATENT DOCUMENTS

CN 116937137 A * 10/2023 ............. H01Q 5/385
JP 4388435 B2 12/2009
(Continued)

OTHER PUBLICATIONS

The extended European search report for EP 22756473.9 mailed on Jun. 28, 2024.

(Continued)

*Primary Examiner* — Zhitong Chen
(74) *Attorney, Agent, or Firm* — CANTOR COLBURN LLP

(57) ABSTRACT

An electronic apparatus includes: a first housing; a second housing rotatably connected to the first housing; an opening formed along a third edge of the second housing; a switch located on a path that connects the opening and a ground region; and a wireless communication circuit. The first housing includes a first edge extending in a first direction and a second edge extending in a second direction. The second housing includes the third edge corresponding to the first edge and a fourth edge corresponding to the second edge when the first and second housings face each other. Parts of the first and second edge are made of a conductive material. When the first housing and the second housing face each other, the wireless communication circuit feeds power to the conductive material and controls the switch to electrically short-circuit the third edge and the ground region.

18 Claims, 34 Drawing Sheets

(56) References Cited

U.S. PATENT DOCUMENTS

| | | | | |
|---|---|---|---|---|
| 9,831,928 | B2 | 11/2017 | Kim et al. | |
| 10,153,799 | B2 | 12/2018 | Hwang et al. | |
| 10,243,624 | B2 | 3/2019 | Kim et al. | |
| 11,079,796 | B2 | 8/2021 | Choe et al. | |
| 11,899,492 | B2 | 2/2024 | Lin et al. | |
| 2013/0241795 | A1 | 9/2013 | Sung et al. | |
| 2017/0141820 | A1 | 5/2017 | Kim et al. | |
| 2019/0140342 | A1* | 5/2019 | Lim | H01Q 5/335 |
| 2019/0372635 | A1 | 12/2019 | Guo | |
| 2020/0076062 | A1 | 3/2020 | Lee et al. | |
| 2020/0266524 | A1 | 8/2020 | Yoon et al. | |
| 2020/0333855 | A1 | 10/2020 | Kim et al. | |
| 2021/0318720 | A1* | 10/2021 | Lin | H01Q 1/243 |
| 2022/0115768 | A1 | 4/2022 | Oh et al. | |

FOREIGN PATENT DOCUMENTS

| | | | | |
|---|---|---|---|---|
| KR | 20170044527 | A | 4/2017 | |
| KR | 20170116262 | A | 10/2017 | |
| KR | 101971903 | B1 | 4/2019 | |
| KR | 20190141852 | A | 12/2019 | |
| KR | 20200031607 | A | 3/2020 | |
| KR | 20200100986 | A | 8/2020 | |
| KR | 20200101253 | A | 8/2020 | |
| KR | 102396992 | B1 * | 5/2022 | H04M 1/0268 |
| WO | 2020135150 | A1 | 7/2020 | |

OTHER PUBLICATIONS

Korean Office Action for KR Application No. 10-2021-0022056 mailed on Apr. 10, 2025.

International Search Report mailed Jun. 10, 2022 for PCT/KR2022/002248.

* cited by examiner (a)

(b)

ANTENNA AND ELECTRONIC APPARATUS INCLUDING SAME

CROSS-REFERENCE TO RELATED APPLICATIONS

This application is a continuation application of International Application No. PCT/KR2022/002248 designating the United States, filed on Feb. 16, 2022, in the Korean Intellectual Property Receiving Office and claiming priority to Korean Patent Application No. 10-2021-0022056, filed on Feb. 18, 2021, in the Korean Intellectual Property Office, the disclosures of which are incorporated by reference herein in their entireties.

TECHNICAL FIELD

Embodiments disclosed in the present document relate to a method for enhancing antenna radiation performance by using a switch in an electronic device, and an apparatus thereof.

BACKGROUND ART

An electronic device may have a foldable shape. For example, when the electronic device is folded with reference to a hinge structure, the electronic device may have parts overlap each other while having symmetry with reference to the hinge structure.

The electronic device may include a plurality of antennas operating in various frequency bands in order to exchange signals with an external device. The electronic device may utilize a part of a conductive portion included in the electronic device as an antenna radiator.

DISCLOSURE OF INVENTION

Technical Problem

In a folded state of the electronic device, performance of an antenna formed in a certain region of a housing may be degraded due to a conductive member of the housing which is formed opposite the antenna.

Antenna radiation efficiency of the electronic device may be degraded due to currents that are formed to flow in different directions at a part of a conductive member of the housing positioned on the periphery of an opening formed in a certain region of a support member, and at a part of the support member.

Solution to Problem

Various embodiments disclosed in the present document include a method for enhancing radiation performance of an antenna by reducing degradation of the performance of the antenna in an electronic device including a plurality of antennas, and an apparatus thereof.

According to various embodiments, there is provided an electronic device including: a first housing; a second housing which is connected with the first housing through a connection member to be rotatable relative to the first housing; an opening, which is formed along the third periphery; a switch, which is disposed on a path which connects the opening and a ground region; and a wireless communication circuit, which is disposed in the first housing or the second housing. The first housing includes a first periphery extending in a first direction and a second periphery extending in a second direction which is perpendicular to the first direction, and the second housing includes a third periphery corresponding to the first periphery, and a fourth periphery corresponding to the second periphery when the first housing and the second housing face each other, a first region of the first periphery and a second region of the second periphery that is extended from the first region are formed of a conductive material, a first end of the conductive material is in contact with a first insulation member disposed on the first periphery, a second end of the conductive material is in contact with a second insulation member disposed on the second periphery, a first point of the conductive material is connected with a power feeding path, a second point of the conductive material is connected with a ground region in the first housing, and when the first housing and the second housing face each other, a third insulation member and a fourth insulation member of the second housing are disposed on positions corresponding to the first insulation member and the second insulation member, respectively. The wireless communication circuit is configured to: when the first housing and the second housing face each other, feed power to the conductive material through the power feeding path; and control the switch to electrically short-circuit the third periphery and the ground region.

According to various embodiments, there is provided an electronic device including: a first housing; a second housing which is connected with the first housing through a connection member to be rotatable relative to the first housing; an opening which is formed along the third periphery; a switch which is disposed on a path which connects the opening and a ground region; a wireless communication circuit which is disposed in the first housing or the second housing; and a flexible display which forms a front surface of the electronic device and is disposed over the first housing and the second housing, where the first housing includes a first periphery extending in a first direction and a second periphery extending in a second direction which is perpendicular to the first direction, and the second housing includes a third periphery corresponding to the first periphery, and a fourth periphery corresponding to the second periphery when the first housing and the second housing face each other; where a first region of the first periphery and a second region of the second periphery that is extended from the first region are formed of a conductive material, where a first end of the conductive material is in contact with a first insulation member disposed on the first periphery, where a second end of the conductive material is in contact with a second insulation member disposed on the second periphery, where a first point of the conductive material is connected with a power feeding path, where a second point of the conductive material is connected with a ground region in the first housing, where, when the first housing and the second housing face each other, a third insulation member and a fourth insulation member of the second housing are disposed on positions corresponding to the first insulation member of the first periphery and the second insulation member, respectively, where the wireless communication circuit is configured to: when the first housing and the second housing face each other, feed power to the conductive material through the power feeding path; and control the switch to electrically short-circuit the third periphery and the ground region.

Advantageous Effects of Invention

According to various embodiments, a flow of a current generated around an opening formed in an electronic device may be adjusted by using a switch, so that, even when the electronic device is in a folded state, a degree of degradation of antenna radiation efficiency may be effectively reduced compared to a case in which the electronic device is in a flat state.

According to various embodiments, an opening may be connected through a switch, and a resonance generated through the opening and a resonance generated through an antenna formed in a certain region of the electronic device may be generated independently from each other, so that radiation efficiency of the antenna formed in the certain region of the electronic device may be effectively enhanced.

In addition, various effects that are directly or indirectly understood through the disclosure may be provided.

BEST MODE FOR CARRYING OUT THE INVENTION

Hereinafter, various embodiments of the disclosure will be described with reference to the accompanying drawings. However, these are not intended to limit the disclosure to a specific embodiment and should be understood as including various modifications, equivalents, or alternatives of embodiments of the disclosure.

Figure 1:
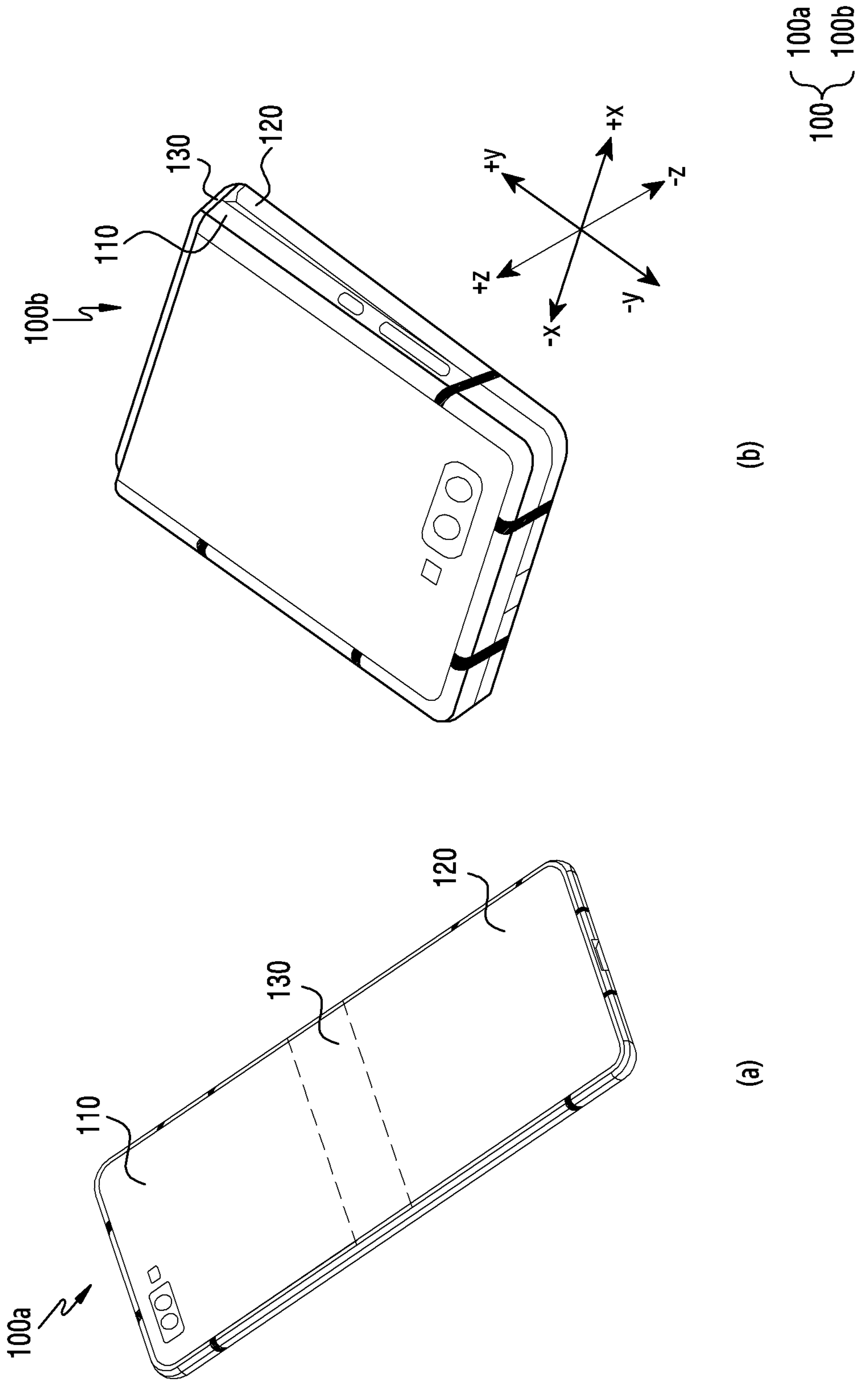
FIG. 1 is a view illustrating a flat state and a folded state of an electronic device according to various embodiments.

FIG. 1 illustrates a flat state 100*a* and a folded state 100*b* of an electronic device 100 according to various embodiments.

Referring to FIG. 1, the electronic device 100 may include a first housing 110, a second housing 120, and a hinge structure 130.

According to an embodiment, when the electronic device 100 is in the flat state 100*a*, the first housing 110 and the second housing 120 may be connected with each other through the hinge structure 130. At least part of a display (not shown) positioned in the first housing 110, the second housing 120, and/or the hinge structure 130 may form at least part of one surface of the electronic device 100.

According to an embodiment, the electronic device 100 may include a flexible display (for example, a foldable display) disposed in a region that is formed by the first housing 110 and the second housing 120.

According to an embodiment, when the electronic device 100 is in the folded state 100*b*, the first housing 110 and the second housing 120 may have such a shape that they overlap each other.

Figure 2:
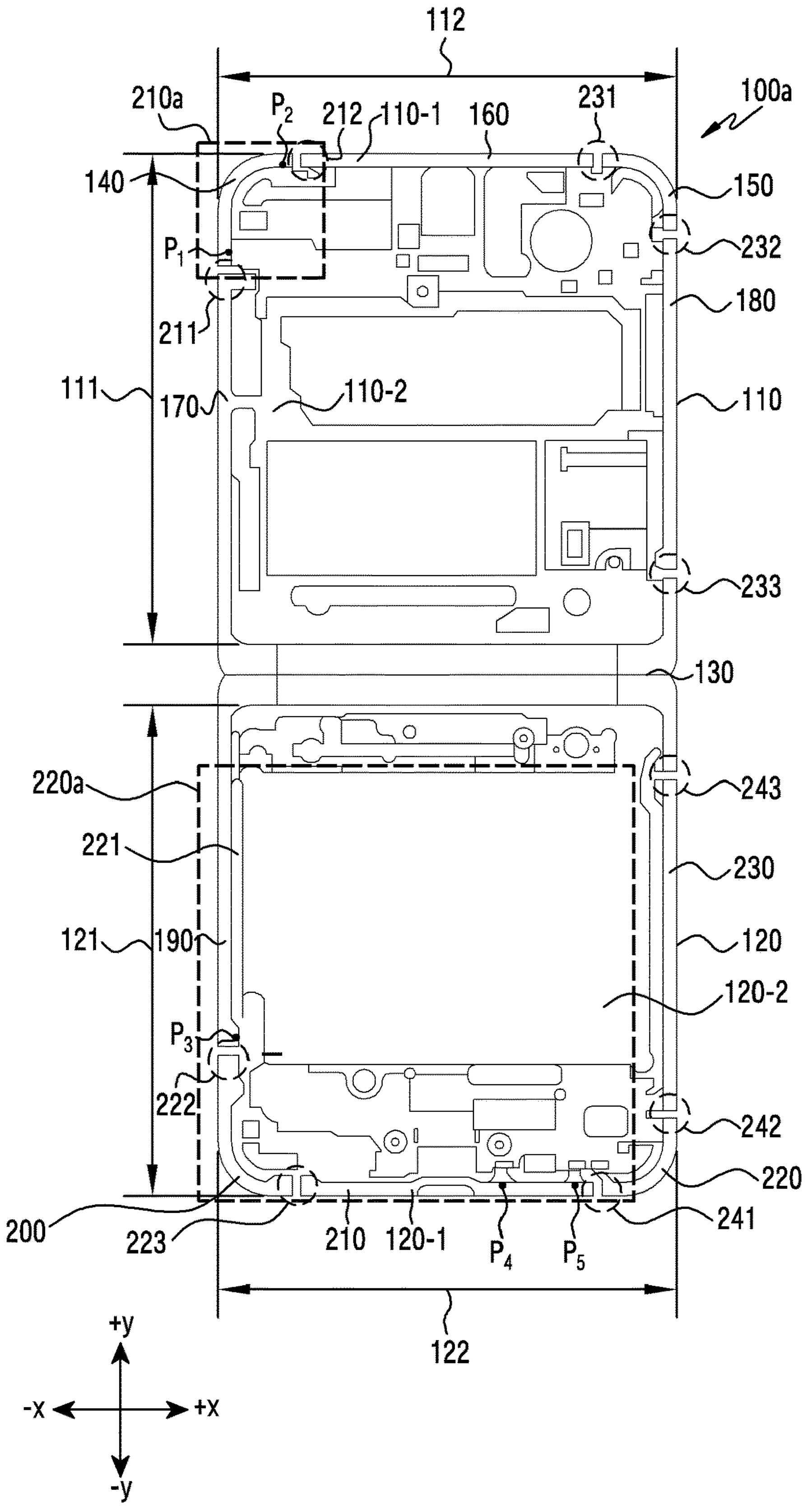
FIG. 2 is a view illustrating a first housing and a second housing of the electronic device according to various embodiments.

FIG. 2 illustrates components of the first housing 110 and the second housing 120 of the electronic device 100 according to various embodiments.

Referring to FIG. 2, the first housing 110 may include a first side surface member 110-1 and a first support member 110-2. In an embodiment, the first side surface member 110-1 may include a first periphery 111 and a second periphery 112. The second housing 120 may include a second side surface member 120-1 and a second support member 120-2. In an embodiment, the second side surface member 120-1 may include a third periphery 121 and a fourth periphery 122. The first side surface member 110-1 and the second side surface member 120-1 may include a conductive material.

According to an embodiment, the first periphery 111 may be a certain region of the first housing 110 that is formed along a first direction (for example, a −y direction in view (b) of FIG. 1), and the second periphery 112 may be a certain region of the first housing 110 that is formed along a second direction (a +x direction). In an example, the first direction (the −y direction in view (b) of FIG. 1) and the second direction (the +x direction in view (b) of FIG. 1) may be substantially perpendicular to each other.

According to an embodiment, the first side surface member 110-1 may include a first conductive portion 140, a second conductive portion 170, a third conductive portion 160, a fourth conductive portion 150, a fifth conductive portion 180, a first segment 211, a second segment 212, a third segment 231, a fourth segment 232, or a fifth segment 233. For example, the first segment 211 may be positioned between the first conductive portion 140 and the second conductive portion 170. In another example, the second segment 212 may be positioned between the first conductive portion 140 and the third conductive portion 160. The third segment 231 may be positioned between the third conductive portion 160 and the fourth conductive portion 150. The fourth segment 232 may be positioned between the fourth conductive portion 150 and the fifth conductive portion 180. The fifth segment 233 may be positioned on the other side of the fifth conductive portion 180 which is different from one side of the fifth conductive portion 180 where the fourth segment 232 is positioned. In an embodiment, the first conductive portion 140, the second conductive portion 170, the third conductive portion 160, the fourth conductive portion 150, or the fifth conductive portion 180 may be formed of a conductive material. The first segment 211, the second segment 212, the third segment 231, the fourth segment 232, or the fifth segment 233 may be filled with an insulating material.

According to an embodiment, the first periphery 111 may include at least part of the first conductive portion 140, the second conductive portion 170, or the first segment 211. According to an embodiment, the second periphery 112 may include at least another part of the first conductive portion 140, the third conductive portion 160, or the fourth conductive portion 150.

According to an embodiment, at least part of the first conductive portion 140 or the fourth conductive portion 150 may be formed of a curved portion. However, at least part of the first conductive portion 140 or the fourth conductive portion 150 is not limited to the curved portion, and may be formed substantially at a right angle in another embodiment.

According to an embodiment, a P1 point may be positioned at a part of the first conductive portion 140, and a P2 point may be positioned at another part of the first conductive portion 140. A connection relationship of the P1 point and the P2 point illustrated in a certain region 210*a* of the first housing with other components of the electronic device 100 will be described below with reference to FIG. 3.

According to an embodiment, the third periphery 121 may be a certain region of the second housing 120 that is formed along a first direction (for example, a +y direction in view (b) of FIG. 1), and the fourth periphery 122 may be a certain region of the second housing 120 that is formed along a second direction (a +x direction in view (b) of FIG. 1). In an example, the first direction (the +y direction in view (b) of FIG. 1) and the second direction (the +x direction in view (b) of FIG. 1) may be substantially perpendicular to each other.

According to an embodiment, the second side surface member 120-1 may include a sixth conductive portion 190, a seventh conductive portion 200, an eighth conductive portion 210, a ninth conductive portion 220, a tenth conductive portion 230, a sixth segment 222, a seventh segment 223, an eighth segment 241, a ninth segment 242, or a tenth segment 243. For example, the sixth segment 222 may be positioned between the sixth conductive portion 190 and the seventh conductive portion 200. In another example, the seventh segment 223 may be positioned between the seventh conductive portion 200 and the eighth conductive portion 210. The eighth segment 241 may be positioned between the eighth conductive portion 210 and the ninth conductive portion 220. The ninth segment 242 may be positioned between the ninth conductive portion 220 and the tenth conductive portion 230. The tenth segment 243 may be positioned on the other side of the tenth conductive portion 230 which is different from one side of the tenth conductive portion 230 where the ninth segment 242 is positioned. In an embodiment, the sixth conductive portion 190, the seventh conductive portion 200, the eighth conductive portion 210, the ninth conductive portion 220, or the tenth conductive portion 230 may be formed of a conductive material. The sixth segment 222, the seventh segment 223, the eighth segment 241, the ninth segment 242, or the tenth segment 243 may be filled with an insulating material.

According to an embodiment, an opening 221 which is formed along the third periphery 121 may be included in at least a certain region of the second support member 120-2. For example, the opening 221 may be formed at a position adjacent to the sixth conductive portion 190 or the seventh conductive portion 200. For example, the opening 221 may have such a shape that the opening is recessed by a predetermined width, compared to the third periphery 121 positioned adjacent to the opening 221, and in this case, the opening 221 may be filled with a nonconductive material (for example, an injected material with predetermined permittivity).

According to an embodiment, a P3 point may be positioned at a part of the sixth conductive portion 190 which is formed along the third periphery 121, and a P4 point and/or a P5 point may be positioned at parts of the fourth periphery 122. A connection relationship of the P3 point, the P4 point and the P5 point illustrated in a certain region 220*a* of the second housing 120 with other components of the electronic device 100 will be described below with reference to FIG. 4.

Figure 3:
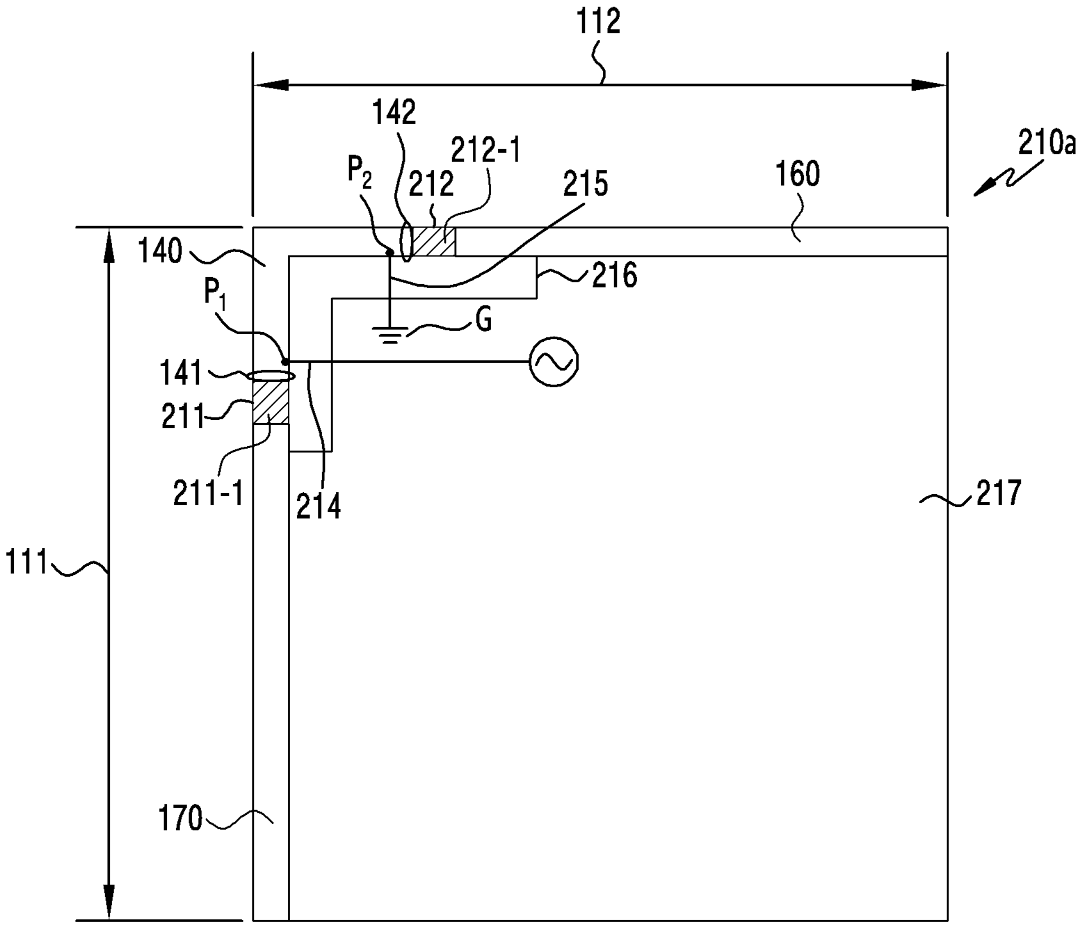
FIG. 3 is a view illustrating a certain region of the first housing including a conductive material according to an embodiment.

FIG. 3 illustrates the certain region 210*a* of the first housing 110 including the first conductive portion 140 according to an embodiment.

Referring to FIG. 3, the first conductive portion 140, the first segment 211 or the second segment 212, a nonconductive member (or a nonconductive region) 216, or a printed circuit board 217 may be disposed in the certain region 210*a* of the first housing 110. For example, a first insulation member 211-1 may be disposed in the first segment 211, and a second insulation member 212-1 may be disposed in the second segment 212.

According to an embodiment, at least part of the first conductive portion 140 may be formed on the first periphery 111 of the electronic device 100, and at least part of the second conductive portion 170 may be formed on the second periphery 112. A conductive portion corresponding to at least one of the first conductive portion 140 or the second conductive portion 170 may be omitted from the drawings.

According to an embodiment, the nonconductive member 216 may be an opening region or a region that is formed by injecting a nonconductive material.

According to an embodiment, a first end 141 of the first conductive portion 140 may be in contact with the first insulation member 211-1, and a second end 142 of the first conductive portion 140 may be in contact with the second insulation member 212-1, such that the first conductive portion 140 is formed in a certain region of the first periphery 111 and the second periphery 112.

According to an embodiment, the P1 point of the first conductive portion 140 which is a power feeding point may be electrically connected with a wireless communication circuit (e.g., wireless communication module 2292 in FIG. 22) through a power feeding path 214. In an example, the power feeding path 214 may be connected with the P1 point, and power may be fed to the P1 point of the first conductive portion 140 by the wireless communication circuit.

According to an embodiment, the P2 point of the first conductive portion 140 may be connected with a ground region G through a ground path 215. In an embodiment, the ground region G formed on the printed circuit board 217 may be connected with the P2 point through the ground path 215, such that the P2 point of the first conductive portion 140 is grounded. For example, the power feeding point P1 or the ground point P2 of the first conductive portion 140 may be connected through a connection member. For example, the connection member may include a C-clip, a pogo pin, a screw, or a conductive foam.

According to an embodiment, power may be fed to the P1 point, such that the first conductive portion 140 may operate as an antenna radiator to transmit and receive signals to and from an external device. In an embodiment, the first conductive portion 140 may operate as an antenna radiator to transmit and receive a frequency band signal of about 2.4 GHz. For example, the first conductive portion 140 may operate as an antenna for Bluetooth™ communication. A frequency band in which the first conductive portion 140 operates as an antenna radiator is not limited to the above-described frequency band, and the first conductive portion 140 may operate as an antenna radiator even in a frequency band higher than 2.4 GHz or a frequency band lower than 2.4 GHz.

According to an embodiment, the first insulation member 211-1 and the second insulation member 212-1 may be formed of a nonconductive material. For example, the first insulation member 211-1 and the second insulation member 212-1 may be formed of a high-molecular compound having an insulating property, ceramic, or a resin.

Figure 4:
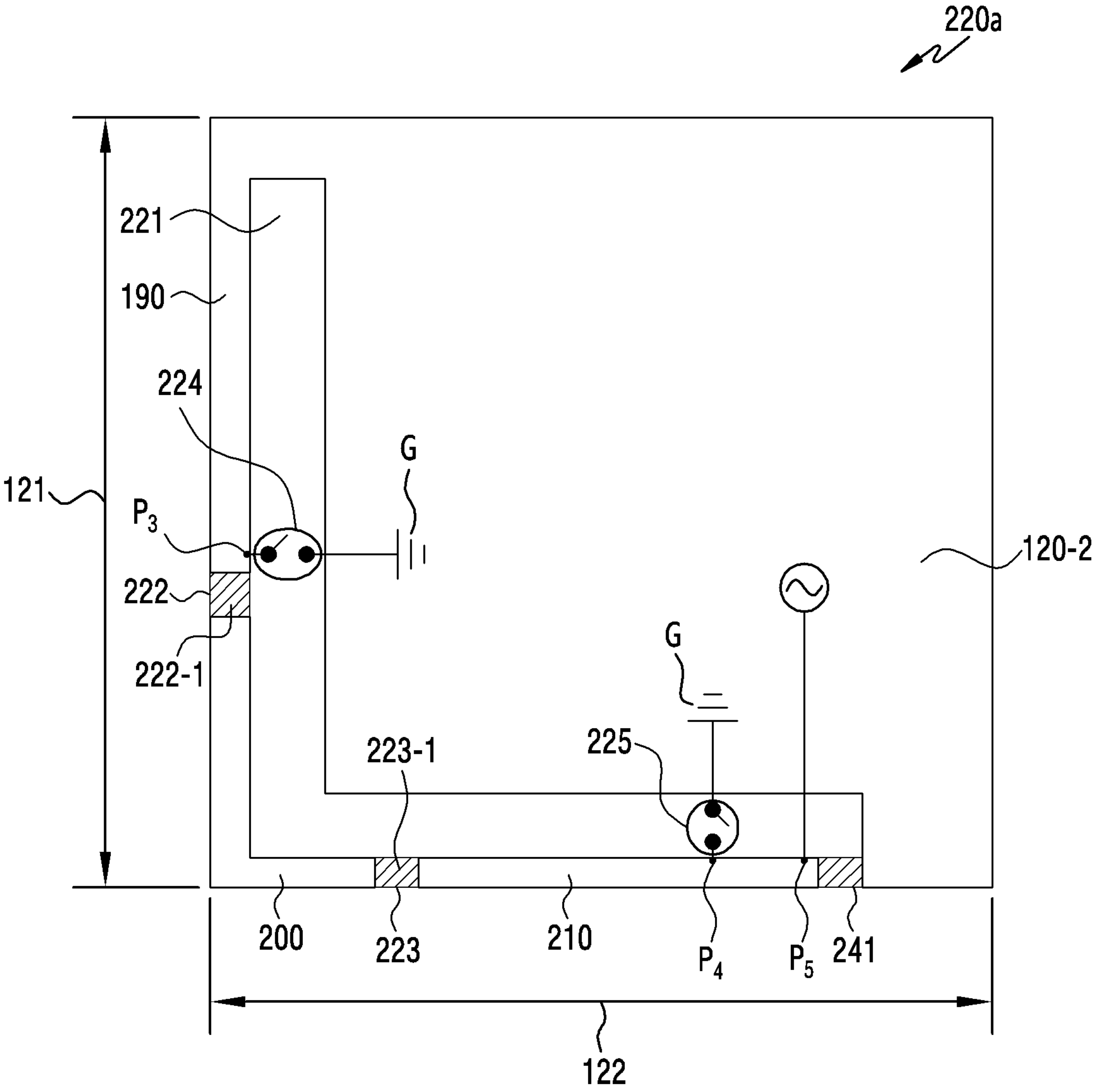
FIG. 4 is a view illustrating a certain region of the second housing including an opening according to an embodiment.

FIG. 4 illustrates the certain region 220*a* of the second housing 120 including the opening 221 according to an embodiment.

Referring to FIG. 4, the certain region 220*a* of the second housing 120 may include the opening 221, the sixth conductive portion 190, the seventh conductive portion 200, the eighth conductive portion 210, the sixth segment 222, or the seventh segment 223. For example, a third insulation member 222-1 may be disposed in the sixth segment 222, and a fourth insulation member 223-1 may be disposed in the seventh segment 223.

According to an embodiment, the third insulation member 222-1 may be included in a certain region of the third periphery 121, and the fourth insulation member 223-1 may be included in a certain region of the fourth periphery 122. In an example, the third insulation member 222-1 and the fourth insulation member 223-1 may be formed of a nonconductive material. For example, the third insulation member 222-1 and the fourth insulation member 223-1 may be formed of a high-molecular compound having an insulating property, ceramic or a resin.

According to an embodiment, the opening 221 may be formed along the third periphery 121. According to an embodiment, the opening 221 may be formed along the third periphery 121 and the fourth periphery 122. In an example, the opening 221 may be formed on the second support member 120-2. For example, the opening 221 may be formed between the second support member 120-2 and the sixth conductive portion 190, the seventh conductive portion 200 or the eighth conductive portion 210.

According to an embodiment, a first switch 224 may be disposed in the opening 221. In an example, the $P_3$ point positioned at a part of the sixth conductive portion 190 may be electrically connected with a ground region G by passing through the opening 221 through the first switch 224.

According to an embodiment, when the first switch 224 is in an ON state, the $P_3$ point and the ground region G may be electrically connected.

According to an embodiment, when the first switch 224 is in an OFF state, the $P_3$ point and the ground region G may go into an electrically opened state (i.e., electrically disconnected).

According to an embodiment, the $P_3$ point may be positioned on the sixth conductive portion 190 disposed on the third periphery 121. For example, the $P_3$ point may be positioned adjacent to the third insulation member 222-1. For example, the $P_3$ point may be positioned within about 2 cm away from the third insulation member 222-1.

According to an embodiment, a second switch 225 may be disposed in the opening 221, spaced apart from the first switch 224. In an example, the second switch 225 may selectively connect the eighth conductive portion 210 and a ground portion G. For example, the $P_4$ point positioned at a part of the fourth periphery 122 may be connected with the ground region G by passing through the opening 221 through the second switch 225, thereby being used as a ground portion. In another example, a wireless communication circuit (not shown) may perform impedance matching for adjusting a resonance frequency of the eighth conductive portion 210 through the $P_4$ point.

According to an embodiment, the first switch 224 or the second switch 225 may receive a switch control signal from a wireless communication circuit (e.g., wireless communication module 2292 in FIG. 22) or a processor (e.g., processor 2220 in FIG. 22) and may operate based on the switch control signal.

According to an embodiment, the $P_4$ point may be positioned on the eighth conductive portion 210 disposed on the fourth periphery 122. For example, the $P_4$ point may be positioned adjacent to the $P_5$ point. For example, the $P_4$ point may be positioned within about 2 cm away from the $P_5$ point.

According to an embodiment, the $P_5$ point positioned at a part of the eighth conductive portion 210 may be electrically connected with a wireless communication circuit to transmit and/or receive an RF signal. In an example, the $P_5$ point which is a power feeding point may be connected with the wireless communication circuit through a power feeding path, and may be fed with power.

In an embodiment, the first switch 224 or the second switch 225 may be controlled by a processor or a wireless communication circuit.

In an embodiment, the second switch 225 may serve as a ground portion or may perform a matching role to change or match a resonance frequency of an antenna including the eighth conductive portion 210.

According to an embodiment, the first conductive portion 140 or the second conductive portion 170 illustrated in FIG. 3 may be omitted from FIG. 4.

Figure 5:
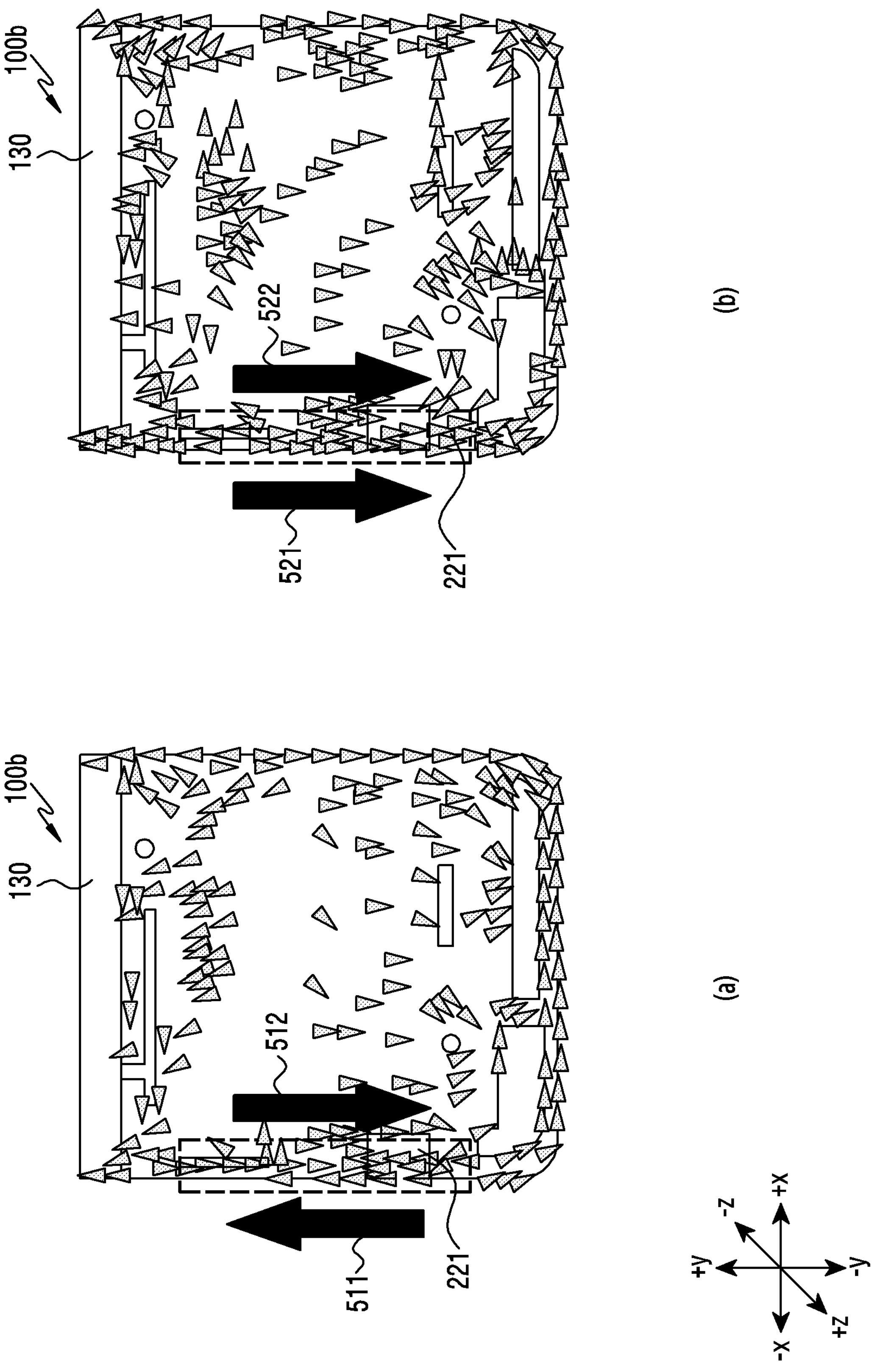
FIG. 5 is a view illustrating a current flow of the electronic device formed by switching of a first switch according to an embodiment.

FIG. 5 illustrates a current flow of the electronic device 100 formed by switching of the first switch 224 according to an embodiment.

Referring to FIG. 5, a flow of a current formed in the folded state **100*b* of the electronic device 100 may be changed according to a switching state of the first switch 224. View (a) of FIG. 5 illustrates a flow of a current formed in the folded state 100*b* of the electronic device 100 when the first switch 224 is in the OFF state, and view (b) of FIG. 5 illustrates a flow of a current formed in the folded state 100*b* of the electronic device 100 when the first switch 224** is in the ON state.

According to an embodiment, when the first switch 224 is in the OFF state, a first current flow 511 and a second current flow 512 which are formed adjacent to the opening 221 in the folded state **100*b* of the electronic device 100 may be formed to be oriented in different directions. For example, the first current flow 511 may be formed in the sixth conductive portion 190, and the second current flow 512 may be formed in the second support member 120-2. For example, the second current flow 512 may be formed in a portion of the second support member 120-2 where the opening 221 is formed. For example, when the first switch 224 is in the OFF state, the first current flow 511 may be formed in a direction toward the hinge structure 130 (for example, the +y direction in FIG. 5) adjacent to the opening 221 in the folded state 100*b* of the electronic device 100, and the second current flow 512 may be formed in a direction away from the hinge structure 130 (for example, the −y direction of FIG. 5) adjacent to the opening 221**.

According to an embodiment, when the first switch 224 is in the ON state, a third current flow 521 and a fourth current flow 522 which are formed adjacent to the opening 221 in the folded state **100*b* of the electronic device 100 may be formed to be oriented in the same direction. For example, when the first switch 224 is in the ON state, the third current flow 521 and the fourth current flow 522 may be formed in a direction away from the hinge structure 130 (for example, the −y direction in view (b) of FIG. 1) adjacent to the opening 221 in the folded state 100*b* of the electronic device 100**.

According to an embodiment, when flows of currents formed around the opening 221 are oriented in different directions, total antenna radiation efficiency of the electronic device 100 may be reduced. For example, the first current flow 511 and the second current flow 512 may be in the opposite directions and hence may be offset by each other. In another example, the third current flow 521 and the fourth current flow 522 may be in the same direction and hence may not be offset by each other. In an example, the total antenna radiation efficiency of the electronic device 100 may be changed according to switching of the first switch 224, and antenna radiation which is changed according to switching of the first switch 224 will be described below with reference to FIGS. 7 and 8.

Figure 6:
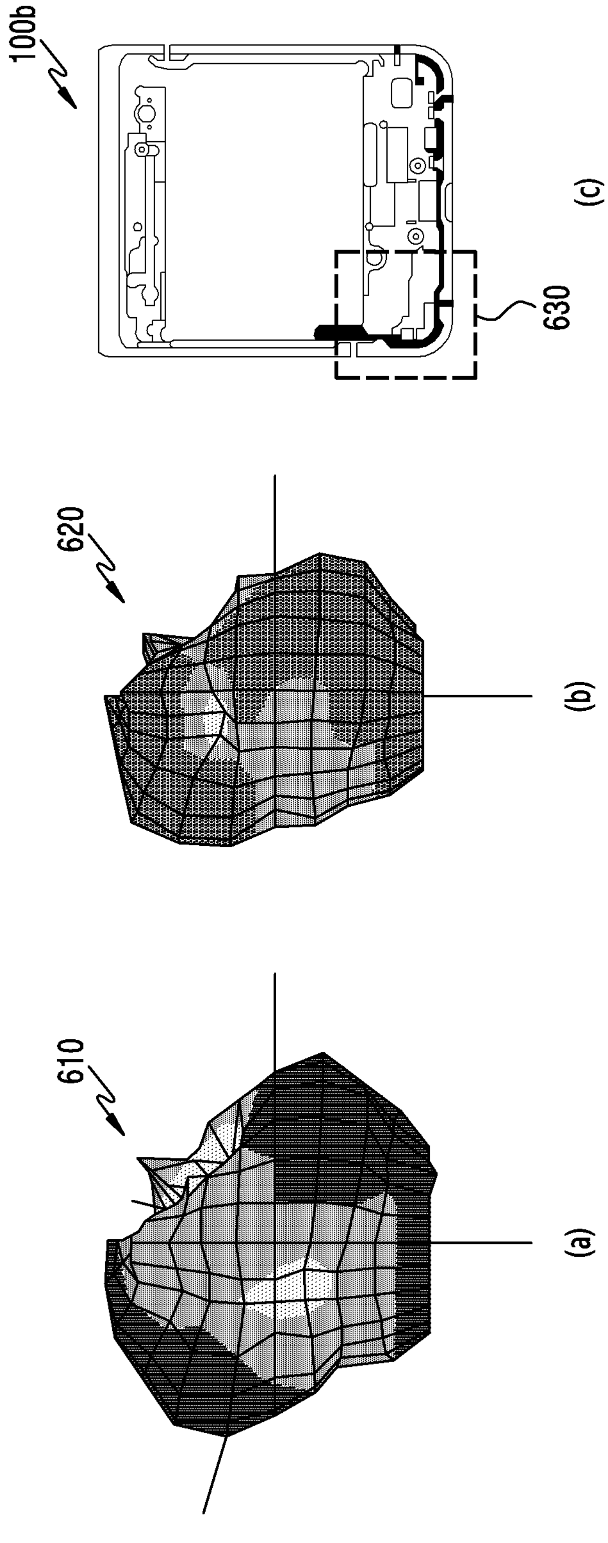
FIG. 6 is a view illustrating antenna radiation of a conductive material caused by switching of the first switch in 3 dimensions (3D) according to an embodiment.

FIG. 6 illustrates antenna radiation of the first conductive portion 140 caused by switching of the first switch 224 in the folded state **100*b* of the electronic device 100** in 3 dimensions (3D) according to an embodiment.

Referring to FIG. 6, a 3D antenna radiation pattern of the first conductive portion 140 which operates as an antenna radiator may be changed according to a switching state of the first switch 224 in the folded state **100*b* of the electronic device 100. View (a) of FIG. 6 illustrates a 3D antenna radiation pattern 610 of the first conductive portion 140 which operates as an antenna radiator when the first switch 224 is in the OFF state, view (b) of FIG. 6 illustrates a 3D antenna radiation pattern 620 of the first conductive portion 140 which operates as an antenna radiator when the first switch 224 is in the ON state, and view (c) of FIG. 6 illustrates an antenna radiation pattern which is formed in a certain region 630 of the second housing 120 due to antenna radiation caused by the first conductive portion 140 operating as an antenna radiator when the first switch 224** is in the ON state.

According to an embodiment, when the first switch 224 is in the ON state, the 3D antenna radiation pattern 620 of the first conductive portion 140, which operates as an antenna radiator, may show radiation to be performed well in at least one direction, compared to the 3D antenna radiation pattern 610 of the first conductive portion 140, which operates as an antenna radiator, when the first switch 224 is in the OFF state. According to another embodiment, the 3D antenna radiation pattern 620 when the first switch 224 is in the ON state may not show radiation to be performed well at least another direction, compared to the 3D antenna radiation pattern 610 when the first switch 224 is in the OFF state. In an example, when the first switch 224 is in the ON state, radiation may be performed well in a direction in which the electronic device 100 transmits and receives signals to and from an external device (for example, a direction perpendicular to a surface of the first housing 110).

According to an embodiment, when the first switch 224 is in the ON state, an antenna radiation pattern may be formed along a periphery of the second housing 120 due to antenna radiation caused by the first conductive portion 140.

Figure 7:
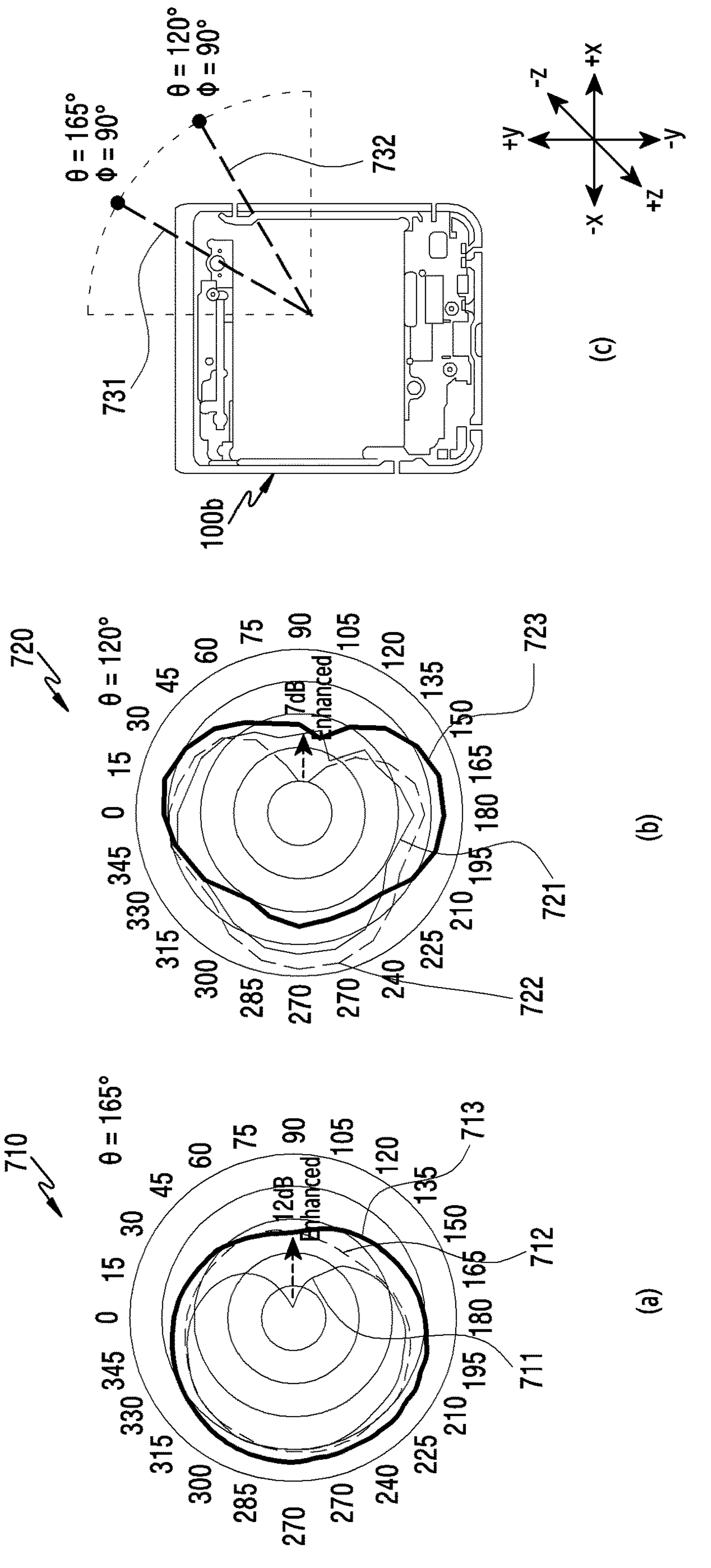
FIG. 7 is a view illustrating antenna radiation of a conductive material caused by switching of the first switch in 2 dimensions (2D) according to an embodiment.

FIG. 7 illustrates radiation of the antenna including the first conductive portion 140 caused by switching of the first switch 224 in 2 dimensions (2D) according to an embodiment. In FIG. 7, an antenna radiation angle θ may be understood as an angle which increases from 0° set as the −y direction of view (c) of FIG. 7 in the counterclockwise direction (for example, a rotation direction from the −y direction toward the +x direction of view I of in FIG. 7), and φ may be understood as an angle which is formed between an axis oriented in the −z direction of FIG. 1 and a plane on which the second housing 120 is placed (for example, an xy plane in view I of FIG. 7).

Referring to FIG. 7, the 2D antenna radiation pattern of the first conductive portion 140 may be enhanced in at least some directions according to switching of the first switch 224.

According to an embodiment, a radiation pattern 710 shows a case in which φ is 90° (for example, the same plane as the plane on which the electronic device 100 is placed) and θ is 165° (for example, a case in which an antenna radiation angle is that of the reference numeral 731 in the folded state 100*b* of the electronic device 100 as illustrated in view I of FIG. 7), and a radiation pattern 720 shows a case in which φ is 90° (for example, the same plane as the plane on which the electronic device 100 is placed) and θ is 120° (for example, a case in which an antenna radiation angle is that of the reference numeral 732 in the folded state 100*b* of the electronic device 100 as illustrated in view (c) of FIG. 7).

According to an embodiment, a 2D antenna radiation pattern of the antenna including the first conductive portion 140 when the electronic device 100 is in the folded state 100*b* and the first switch 224 is in the OFF state in the radiation pattern 710 may be a first radiation pattern 711, and a 2D antenna radiation pattern of the antenna including the first conductive portion 140 when the electronic device 100 is in the folded state 100*b* and the first switch 224 is in the ON state in the radiation pattern 710 may be a second radiation pattern 712, and a 2D antenna radiation pattern of the antenna including the first conductive portion 140 when the electronic device 100 is in the flat state 100*a* in the radiation pattern 710 may be a third radiation pattern 713. According to an embodiment, when the electronic device 100 is in the folded state 100*b* in the radiation pattern 710, the first switch 224 may be changed from the OFF state to the ON state, such that antenna radiation performance may be enhanced in at least some directions. In an example, when the electronic device 100 is in the folded state 100*b* in the radiation pattern 710, the first switch 224 may be changed from the OFF state to the ON state, such that radiation efficiency of the antenna may be enhanced by about 12 dB in at least one direction of a surface on which φ of the electronic device 100 is 90°. In another example, in the second radiation pattern 712, radiation efficiency of the antenna may be lower than a designated value compared to that in the third radiation pattern 713.

According to an embodiment, a 2D antenna radiation pattern of the antenna including the first conductive portion 140 when the electronic device 100 is in the folded state 100*b* and the first switch 224 is in the OFF state in the radiation pattern 720 may be a fourth radiation pattern 721, and a 2D antenna radiation pattern of the antenna including the first conductive portion 140 when the electronic device 100 is in the folded state 100*b* and the first switch 224 is in the ON state in the radiation pattern 720 may be a fifth radiation pattern 722, and a 2D antenna radiation pattern of the antenna including the first conductive portion 140 when the electronic device 100 is in the flat state 100*a* in the radiation pattern 720 may be a sixth radiation pattern 723.

According to an embodiment, when the electronic device 100 is in the folded state 100*b* in the radiation pattern 720, the first switch 224 may be changed from the ON state to the OFF state, such that antenna radiation performance may be enhanced in at least some directions. In an example, when the electronic device 100 is in the folded state 100*b* in the radiation pattern 720, the first switch 224 may be changed from the ON state to the OFF state, such that radiation efficiency of the antenna may be enhanced by about 7 dB in at least one direction of a surface on which φ of the electronic device 100 is 90°. In another example, in the fifth radiation pattern 722, radiation efficiency of the antenna may be lower than a designated value compared to that in the sixth radiation pattern 723.

Figure 8A:
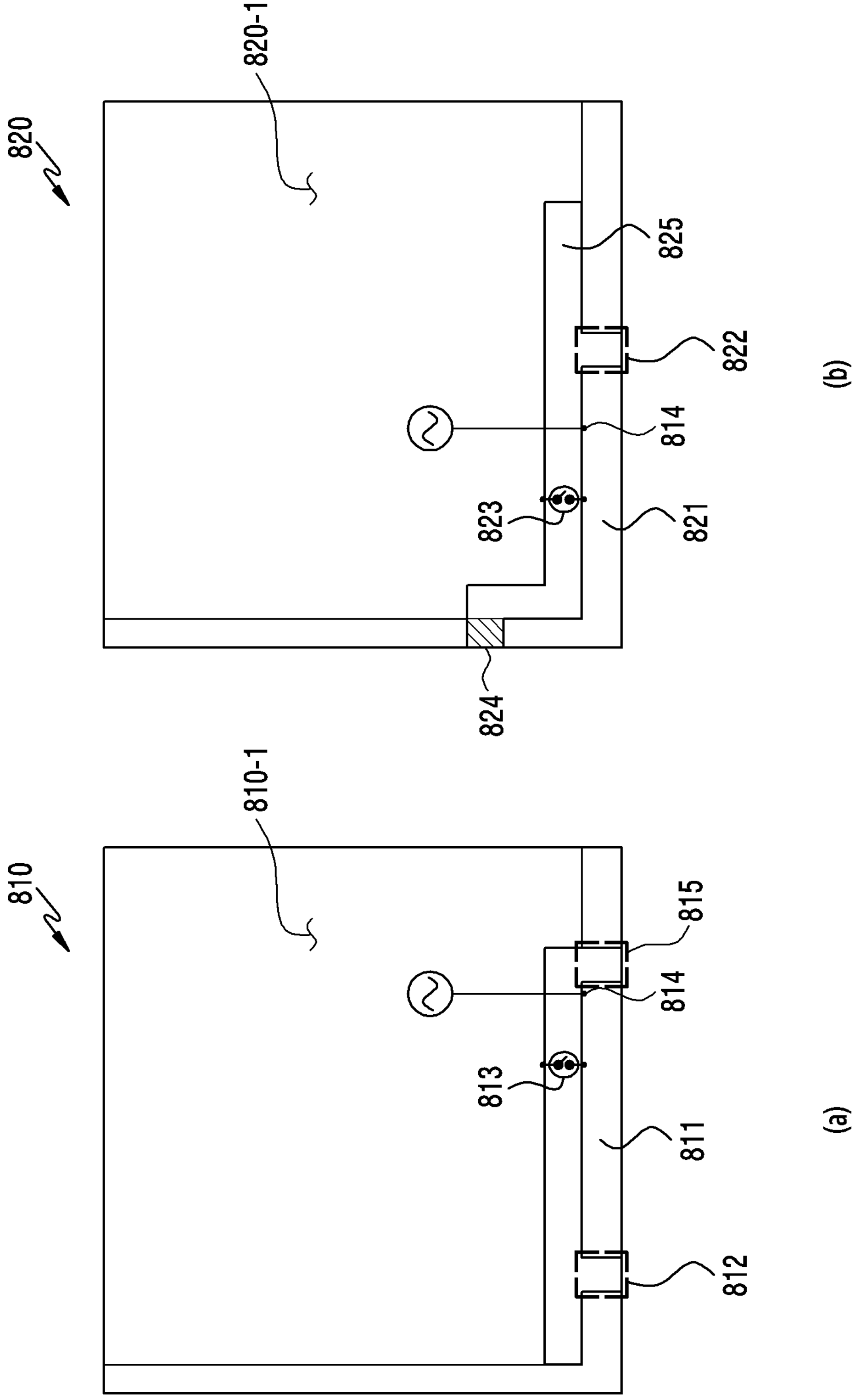
FIG. 8A is a view illustrating a certain region of a first housing according to a first embodiment or a second embodiment.
Figure 8B:
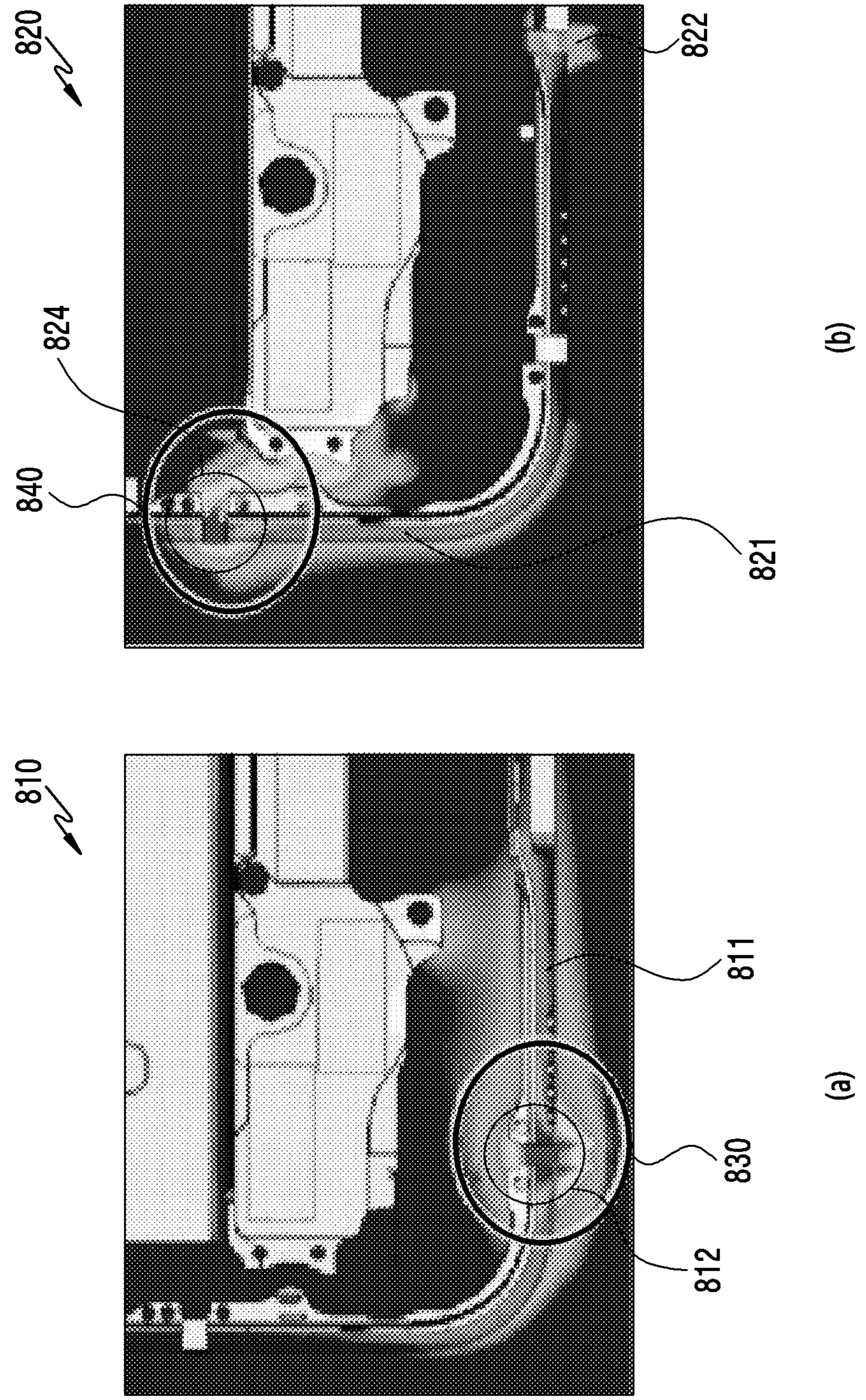
FIG. 8B is a view illustrating an electric field formed in a certain region of the first housing in the embodiments of FIG. 8A.

FIG. 8A illustrates a certain region 810, 820 of the second housing 120 according to a first embodiment or a second embodiment. FIG. 8B illustrates an electric field formed in the certain region 810, 820 of the second housing in embodiments.

Referring to FIG. 8A, view (a) illustrates the certain region 810 of the second housing 120 according to the first embodiment, and view (b) illustrates the certain region 820 of the second housing 120 according to the second embodiment. In an example, the first embodiment and the second embodiment may be understood as embodiments according to a comparison example.

According to an embodiment, a conductive member 811, a first segment 812, a switch 813, or a power feeding point 814 may be formed in the certain region 810 of the second housing 120 according to the first embodiment. In an example, an explanation of the conductive member 811, the first segment 812, the switch 813 or the power feeding point 814 may be understood as being substantially the same as the explanations of the eighth conducive portion 210, the seventh segment 223, the second switch 225, or the $P_5$ point of FIG. 4, respectively.

According to an embodiment, a conductive member 821, a first segment 822, a switch 823, or a power feeding point 814 may be formed in the certain region 820 of the second housing 120 according to the second embodiment. In an example, an explanation of the conductive member 821, the first segment 822, the switch 823 or the power feeding point 814 may be understood as being substantially the same as the explanations of the eighth conducive portion 210, the seventh segment 223, the second switch 225, or the P5 point of FIG. 4, respectively.

According to an embodiment, a support member 810-1 may be formed in the certain region 810 of the second housing 120 according to the first embodiment. In an example, the support member 810-1 formed in the certain region 810 of the second housing 120 may support the conductive member 811.

According to an embodiment, an opening 825 and a support member 820-1 may be formed in the certain region 820 of the first housing 110 according to the second embodiment. In an example, the opening 825 may be formed adjacent to the conductive member 821 within the certain region 820 of the second housing 120. In another example, the support member 820-1 may support the conductive member 821.

Referring to FIG. 8B, an electric field 830 may be generated in the proximity of the first segment 812 in the certain region 810 of the second housing 120 according to the first embodiment, and an electric field 840 may be generated in the proximity of the first segment 822 (or the second segment 824) in the certain region 820 of the first housing 110 according to the second embodiment. In an example, the most electric fields may be generated in a segment region that is farthest from the power feeding point 814. For example, as shown in view (a) of FIG. 8A, a stronger electric field may be generated in a region of the first segment 812 positioned far away from the power feeding point 814, than in a region of the second segment 815 positioned adjacent to the power feeding point 814. In another example, as shown in view (b) of FIG. 8A, a stronger electric field may be generated in a region of the second segment 824 positioned far away from the power feeding point 814 than in a region of the first segment 822 positioned adjacent to the power feeding point 814.

According to an embodiment, the certain region 810 of the second housing 120 according to the first embodiment or the certain region 820 of the second housing 120 according to the second embodiment may not include a floating conductive portion. The floating conductive portion may refer to a conductive portion that is electrically separated from a conductive member adjacent thereto due to a non-conductive material of at least part thereof.

According to an embodiment, the second segment 824 may be disposed with an injected material or a dielectric, such that the conductive member 821 may be mechanically fixed. In an example, the opening (or internal slot) 825 may be disposed with a dielectric which is the same as the material disposed in the second segment 824. In the following descriptions of the drawings, an explanation of a material disposed in a segment or a material forming an opening may be omitted. In addition, in the following descriptions of the drawings, an explanation of the feature of mechanically fixing the conductive member by the segment may be omitted.

Figure 9A:
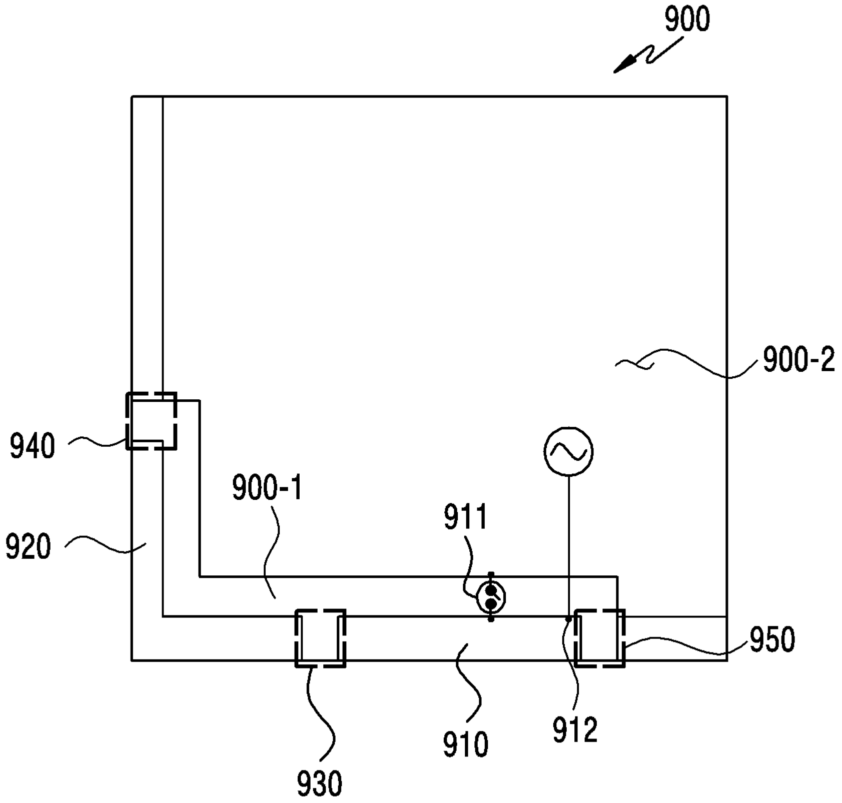
FIG. 9A is a view illustrating a certain region of a first housing according to an embodiment.
Figure 9B:
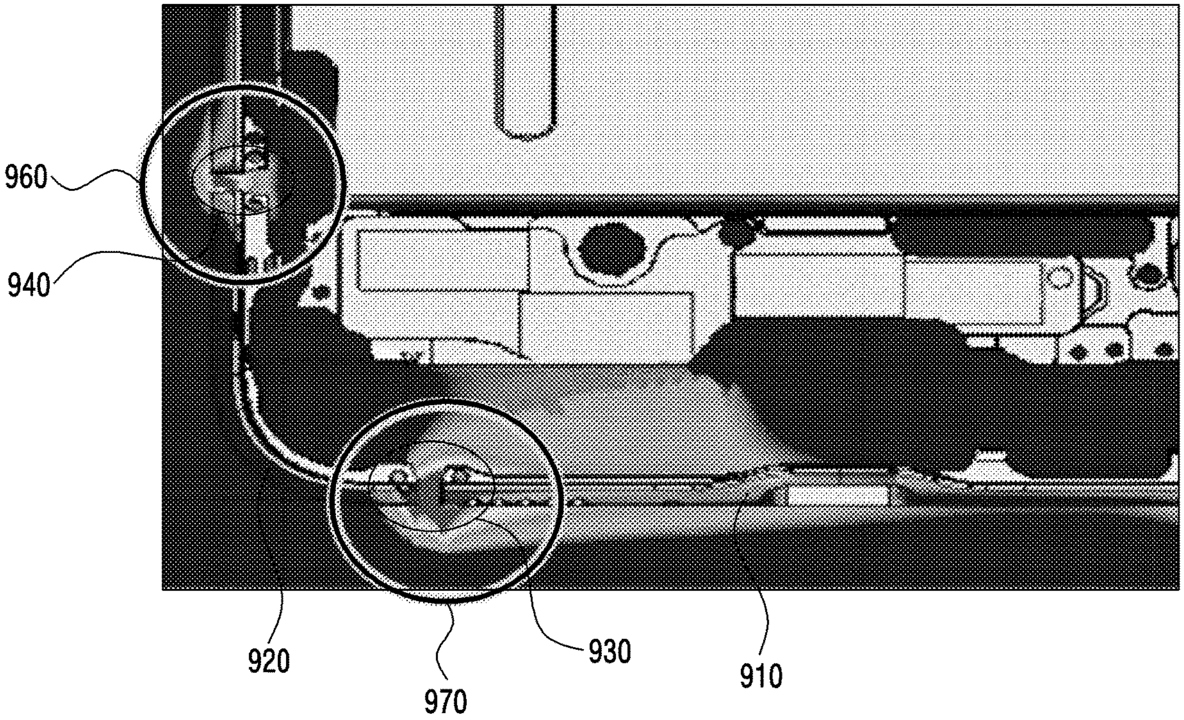
FIG. 9B is a view illustrating an electric field formed in the certain region of the first housing according to an embodiment.

FIG. 9A illustrates a certain region 900 of a second housing 120 according to an embodiment. FIG. 9B illustrates an electric field generated in the certain region 900 of the second housing 120 according to an embodiment.

Referring to FIG. 9A, a first conductive member 910, a second conductive member 920, a first segment 930, a second segment 940, a third segment 950, a switch 911, or a power feeding point 912 may be formed in the certain region 900 of the second housing 120 according to an embodiment. In an example, the first conductive member 910, the second conductive member 920, the first segment 930, the second segment 940, the third segment 950, the switch 911, or the power feeding point 912 formed in the certain region 900 of the second housing 120 according to an embodiment may be understood as corresponding to the eighth conductive portion 210, the seventh conductive portion 200, the seventh segment 223, the sixth segment 222, the eighth segment 241, the second switch 225, or the $P_5$ point of FIG. 4, respectively. Accordingly, an explanation of features and operations of the respective components is omitted.

According to an embodiment, a support member 900-2 may be formed in the certain region 900 of the second housing 120. In an example, the support member 900-2 may include an opening 900-1 and may support the first conductive member 910 and the second conductive member 920. In another example, the opening 900-1 may be formed on the support member 900-2 along the first conductive member 910 and the second conductive member 920.

Referring to FIG. 9B, a magnetic field 960, 970 may be formed in the proximity of the first segment 930 and the second segment 940 in the certain region 900 of the second housing 120 according to an embodiment.

According to an embodiment, the second conductive member 920 may be understood as a floating conductive portion. In an example, the second conductive member 920 may be electrically separated from a conductive member adjacent thereto due to the first segment 930 and the second segment 940, thereby operating as a floating conductive portion.

According to an embodiment, the second conductive member 920 may operate as a floating conductive portion which is electrically separated, and hence, a magnetic field may not be generated in the proximity of the second conductive member 920 or a weak magnetic field may be generated.

Figure 9C:
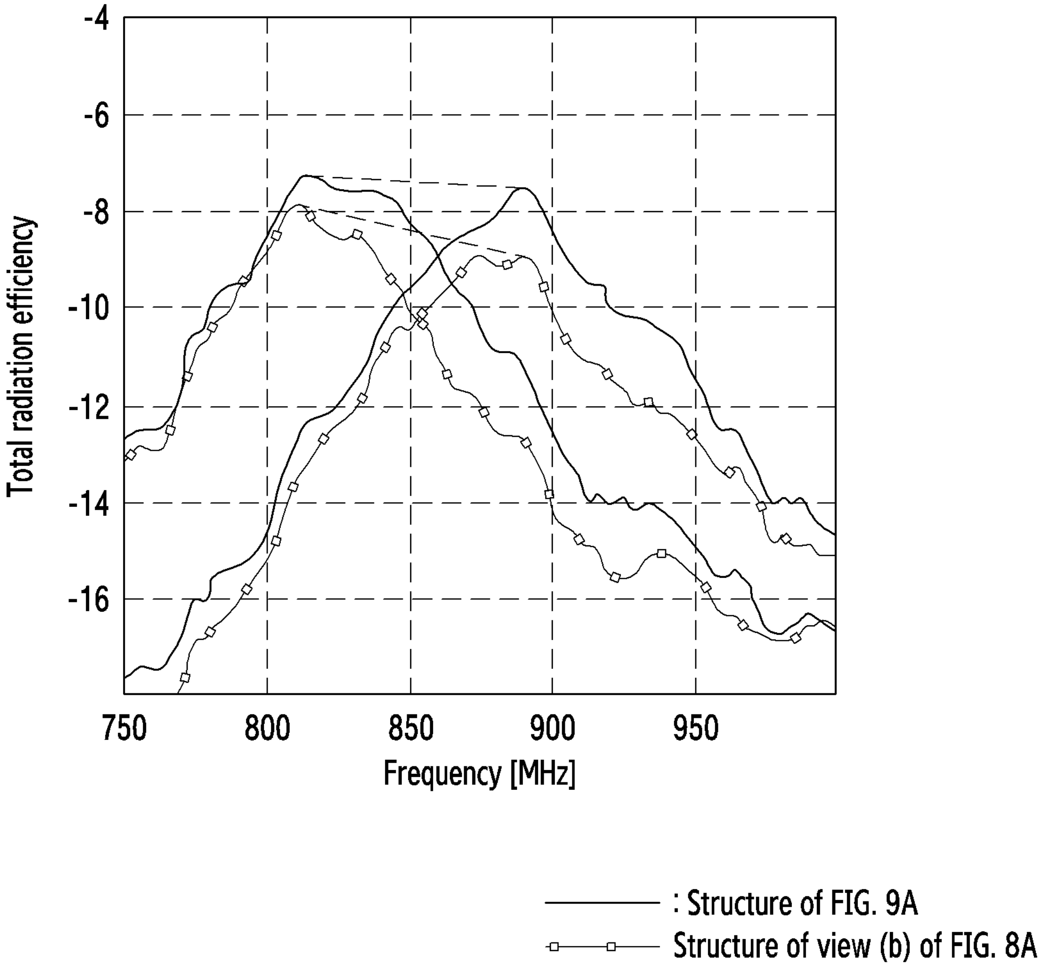
FIG. 9C is a graph illustrating comparison of the first embodiment of FIG. 8A and the embodiment of FIG. 9A regarding total radiation efficiency of an antenna.

FIG. 9C is a graph illustrating comparison of the first embodiment of FIG. 8A and the embodiment of FIG. 9A regarding total radiation efficiency of an antenna.

Referring to FIG. 9C, when a floating conductive portion (for example, the second conductive member 920 of FIG. 9A or 9B) is formed in the certain region 900 of the second housing 120, total radiation efficiency of the antenna may be enhanced in a frequency band of about 750 MHz to about 1 GHz, compared to a case in which a floating conductive portion is not formed in a certain region (for example, the certain region 810 of FIG. 8A) of the second housing 120. In an example, the floating conductive portion may be formed in at least one region of the second housing 120 of the electronic device 100, so that total radiation efficiency of an antenna may be enhanced.

According to an embodiment, when two segments (for example, the first segment 822 and the second segment 824 of view (b) of FIG. 8A) are formed in a certain region of the second housing 120, a conductive member between the two segments may operate as an antenna radiator.

According to an embodiment, when three segments (for example, the first segment 930, the second segment 940, the third segment 950 of FIG. 9A) are formed in a certain region of the first conductive member 910, a conductive member (for example, the first conductive member 910 of FIG. 9A) in which a power feeding point (for example, the power feeding point 912 of FIG. 9A) is disposed may operate as a main radiator, and additional coupling may occur in a floating conductive portion (for example, the second conductive member 920). In an example, the conductive member (for example, the first conductive member 910 of FIG. 9A) in which the power feeding point (for example, the power feeding point 912 of FIG. 9A) is disposed, and the floating conductive portion (for example, the second conductive member 920) may operate as antenna radiators, respectively, so that antenna radiation performance may be enhanced in the flat state 100*a* of the electronic device 100.

Figure 10:
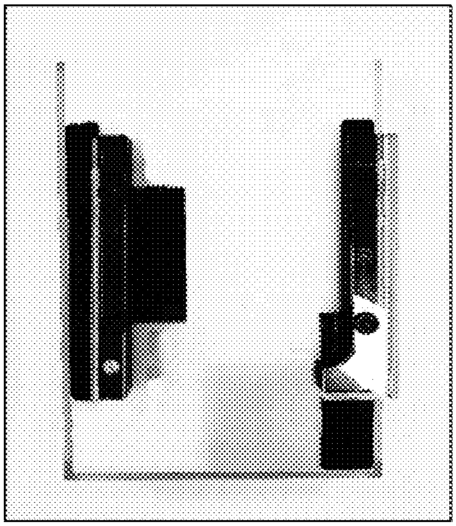
FIG. 10 is a view illustrating a method for identifying an influence of a dielectric on a human body through a jig according to an embodiment.
Figure 10:
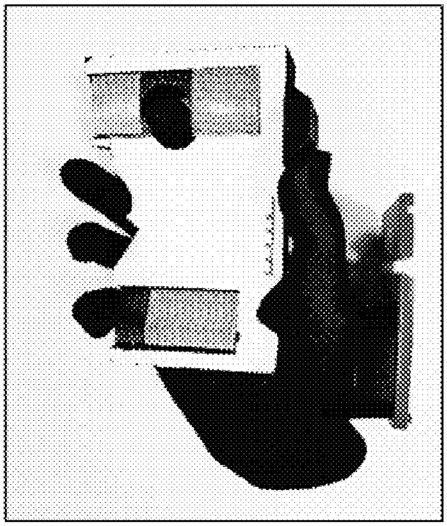

FIG. 10 illustrates a method for identifying an influence of a dielectric on a human body through a jig according to an embodiment.

Referring to FIG. 10, an influence of a dielectric on a human body may be identified through a contact hand jig which is filled with a dielectric on the left and the right as shown in view (a) of FIG. 10, and an influence of a dielectric on a human body may be identified through a hand phantom jig as shown in view (b) of FIG. 10.

Figure 11:
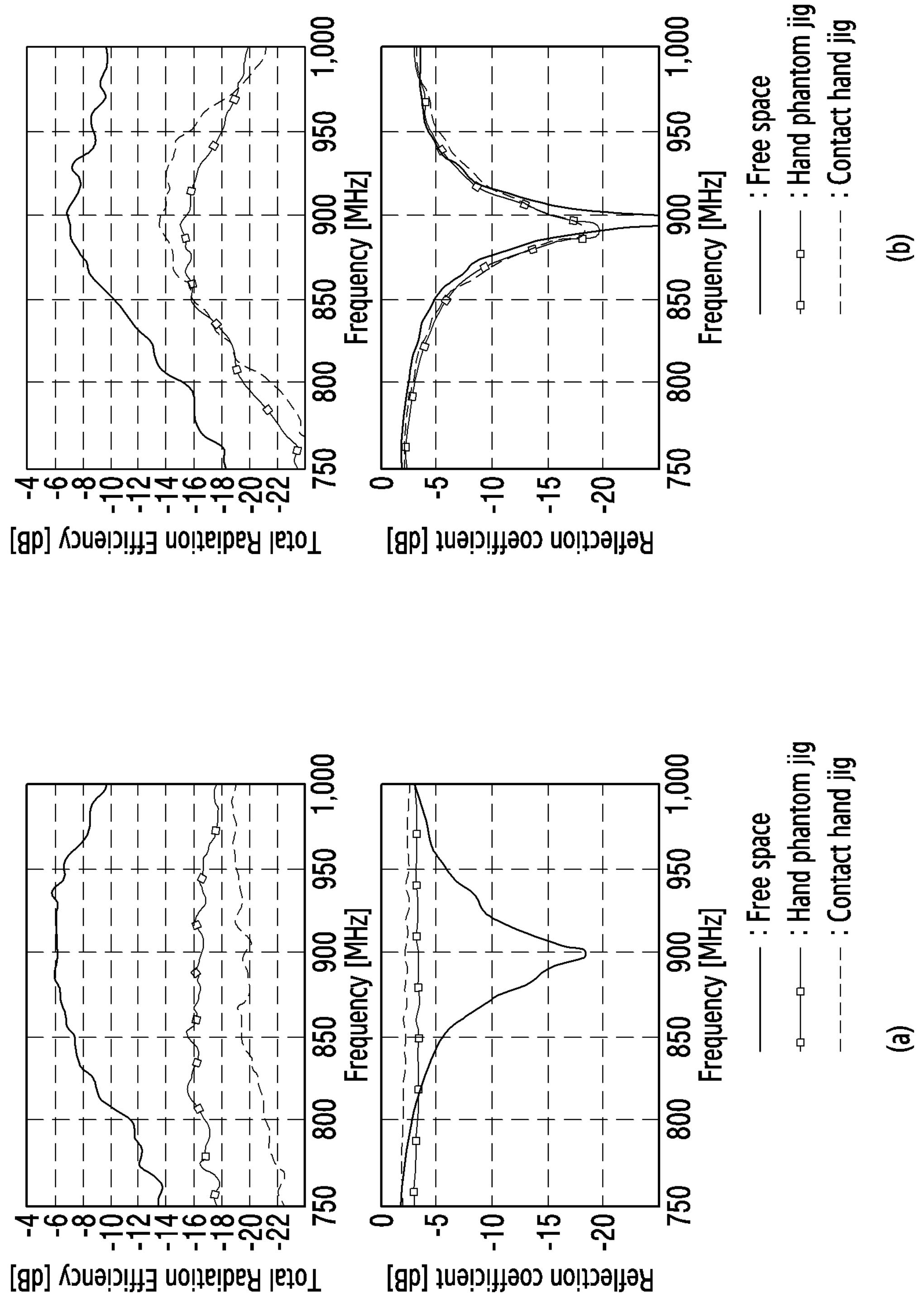
FIG. 11 is a graph illustrating comparison of the second embodiment of FIG. 8A and the embodiment of FIG. 9A regarding total radiation efficiency of the antenna and the reflection coefficient.

FIG. 11 illustrates graphs showing comparison of the second embodiment of FIG. 8A and the embodiment of FIG. 9A regarding total radiation efficiency of an antenna and reflection coefficient. View (a) of FIG. 11 illustrates graphs regarding total radiation efficiency of an antenna and reflection coefficient according to the second embodiment of FIG. 8A, and view (b) of FIG. 11 illustrates graphs regarding total radiation efficiency of an antenna and reflection coefficient according to the embodiment of FIG. 9A.

Referring to FIG. 11, when a hand contact jig or a hand phantom jig is used, antenna radiation efficiency according to the embodiment of FIG. 9A may be enhanced compared to antenna radiation efficiency according to the second embodiment of FIG. 8A.

According to an embodiment, in the second embodiment of FIG. 8A, a floating conductive portion may not be formed in at least a certain region of the second housing 120, and, in the embodiment of FIG. 9A, a floating conductive portion (for example, the second conductive member 920 of FIG. 9) may be formed in at least a certain region of the second housing 120. In an example, when a floating conductive portion is formed in at least a certain region of the second housing 120, degradation of antenna performance may be reduced even if the electronic device 100 is gripped or positioned adjacent to a human body and influences the human body.

TABLE 1

| Total radiation efficiency [dB] | Free space | Hand phantom | Quantization phantom |
|---|---|---|---|
| Second embodiment of FIG. 8A | −6 | −16 | −20 |
| Embodiment of FIG. 9A | −7 | −14 | −15 |
| Differences | −1 | +2 | +5 |

Referring to table 1, when the hand phantom jig is used, the total radiation efficiency of the antenna in the embodiment of FIG. 9A may be enhanced by about 2 dB compared to that in the second embodiment of FIG. 8A. In another example, when the quantization phantom jig is used, the total radiation efficiency of the antenna in the embodiment of FIG. 9A may be enhanced by about 5 dB compared to that in the second embodiment of FIG. 8A. In an example, when a floating conductive portion is formed as in the embodiment of FIG. 9A, degradation of antenna performance may be reduced if the electronic device 100 is gripped or positioned adjacent to a human body.

Figure 12A:
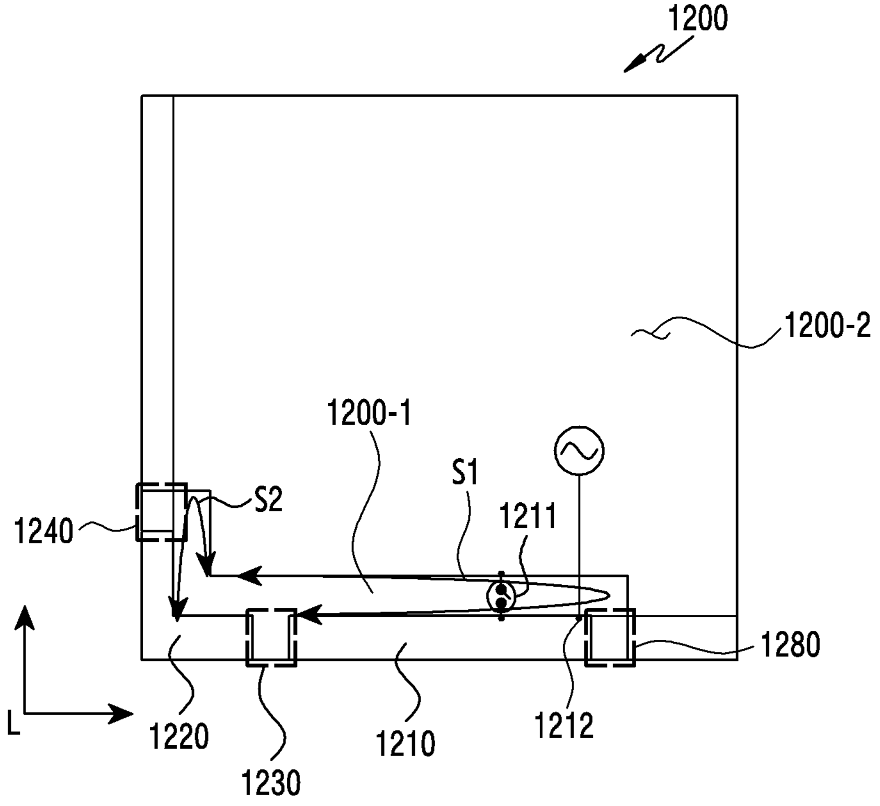
FIG. 12A is a view illustrating a certain region of a first housing including a floating conductive portion (floated frame) according to an embodiment.
Figure 12B:
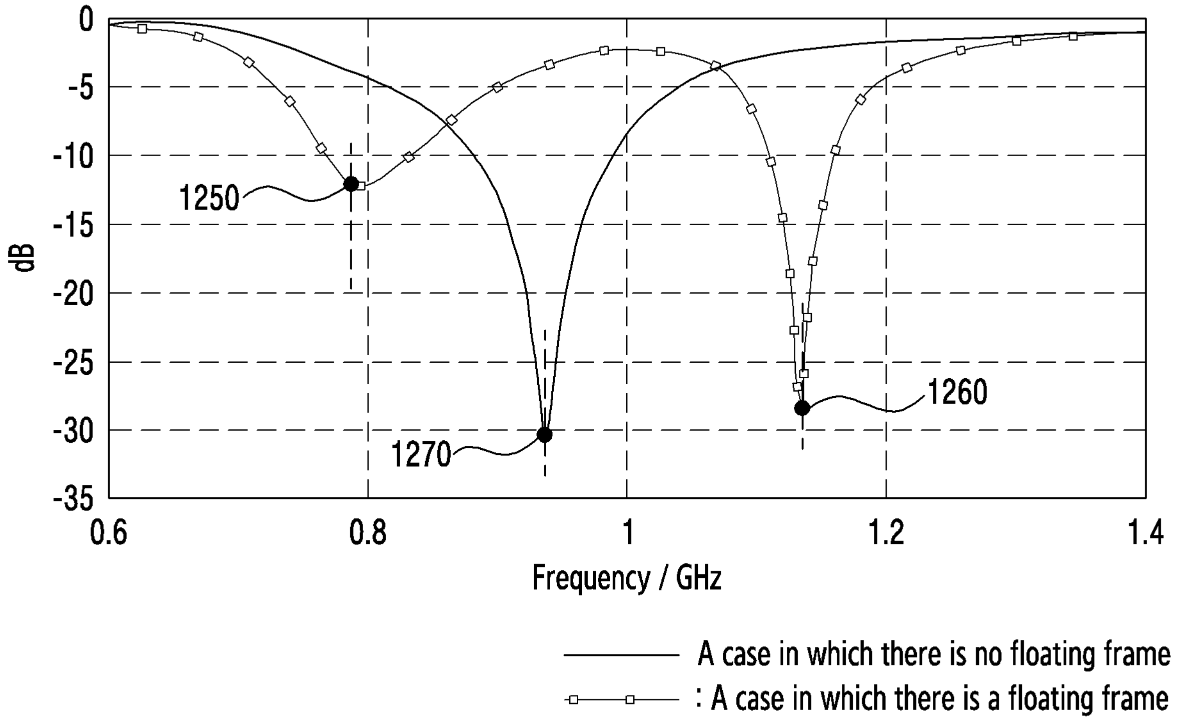
FIG. 12B is a graph illustrating the reflection coefficient according to antenna radiation according to the embodiment of FIG. 12A.

FIG. 12A illustrates a certain region 1200 of a second housing 120 including a floating conductive portion according to an embodiment. FIG. 12B is a graph regarding reflection coefficient according to antenna radiation of the embodiment of FIG. 12A.

Referring to FIG. 12A, a first conductive portion 1210, a second conductive portion (or a floating conductive portion) 1220, a first segment 1230, a second segment 1240, a third segment 1280, a switch 1211 or a power feeding point 1212 may be formed in the certain region 1200 of the second housing 120 according to an embodiment. In an example, the first conductive portion 1210, the second conductive portion 1220, the first segment 1230, the second segment 1240, the third segment 1280, the switch 1211, or the power feeding point 1212 may be understood as corresponding to the eighth conductive portion 210, the seventh conductive portion 200, the seventh segment 223, the sixth segment 222, the eighth segment 241, the second switch 225, or the $P_5$ point of FIG. 4, respectively. Accordingly, an explanation of an electrical connection relationship and operations of the respective components is omitted.

According to an embodiment, a path S1 of a first radiation current may be formed adjacent to the first conductive portion 1210, and a path S2 of a second radiation current may be formed adjacent to the second conductive portion 1220.

According to an embodiment, a support member 1200-2 may be formed in the certain region 1200 of the second housing 120 according to an embodiment. In an example, the support member 1200-2 may include an opening 1200-1 and may support the first conductive portion 1210 and the second conductive portion 1220. In another example, the opening 1200-1 may be formed along the first conductive portion 1210 and the second conductive portion 1220 adjacent thereto.

Referring to FIGS. 12A and 12B, when the second conductive portion (or a floating conductive portion) 1220 is not provided, the first conductive portion (1210) may operate as an antenna radiator having a resonance frequency of about 930 MHz as indicated by a third point 1270 due to an electrical flow of the path S1 of the first radiation current. In an example, when the second conductive portion (or the floating conductive portion) 1220 is longer than an L length of FIG. 12A and has a similar length to that of the first conductive portion 1210, the first conductive portion (1210) and the second conductive portion (1220) may operate as an antenna radiator having resonance frequencies as indicated by a first point 1250 and a second point 1260 due to electrical flows of the path S1 of the first radiation current and the path S2 of the second radiation current.

According to an embodiment, when the path S1 of the first radiation current and the path S2 of the second radiation current which are formed by the first conductive portion 1210 and the second conductive portion 1220 have similar electrical flows, a wide resonance from about 0.8 GHz to 1.15 GHz may be generated.

Figure 13:
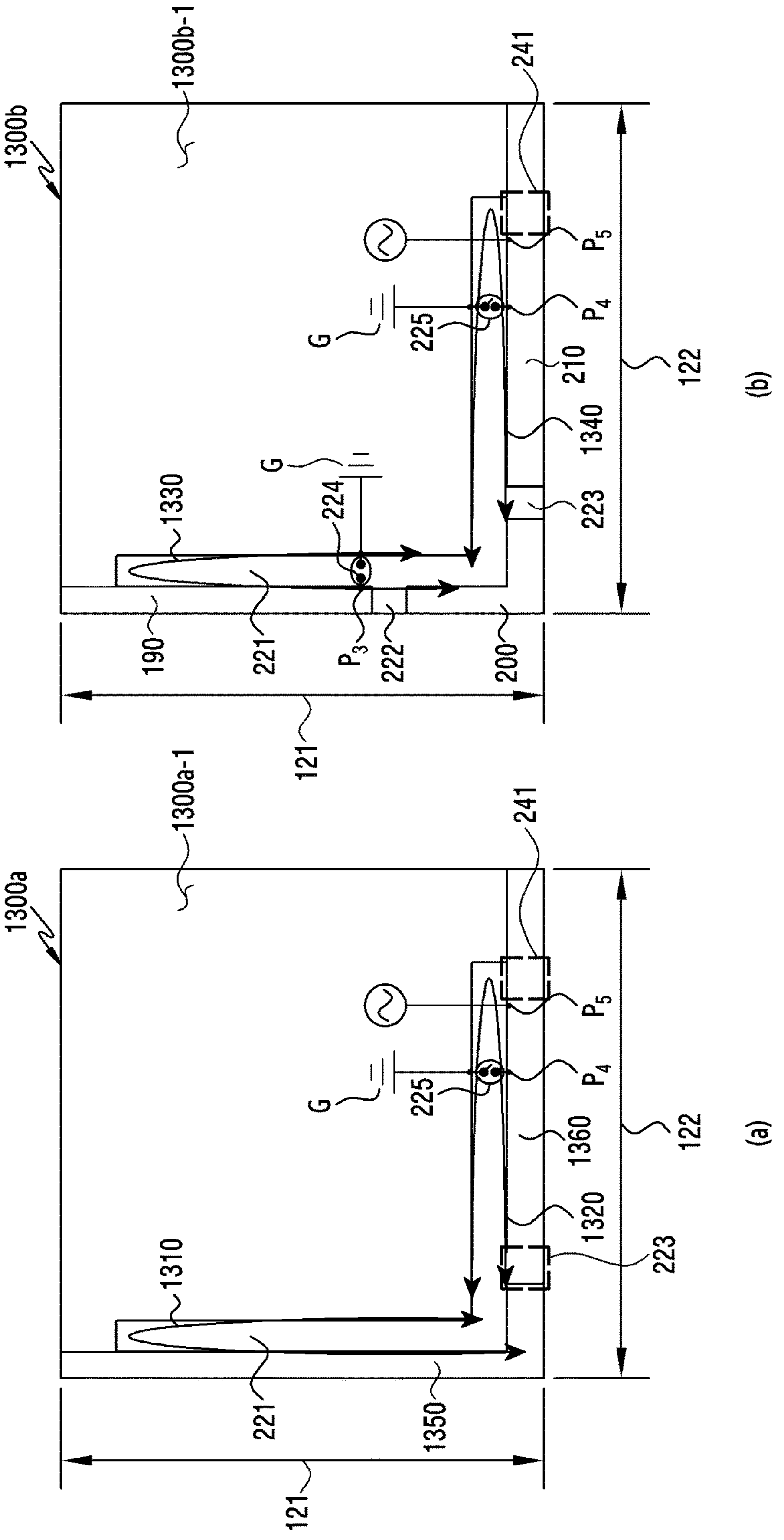
FIG. 13 is a view illustrating a path of a radiation current formed in an opening of an electronic device, and a path of a radiation current formed in a fourth periphery according to an embodiment.

FIG. 13 illustrates a path of a radiation current which is formed in an opening 221 of an electronic device 100, and a path of a radiation current which is formed in a fourth periphery 122. View (a) of FIG. 13 illustrates the electronic device 100 in which a path of a radiation current is changed by utilizing a second switch 225 in a certain region 1300*a* of the electronic device 100 according to an embodiment, and view (b) of FIG. 13 illustrates the electronic device 100 in which a path of a radiation current is changed by utilizing the first switch 224 or a second switch 225 in a certain region 1300*b* of the electronic device 100 according to an embodiment.

Referring to FIG. 13, the certain region 1300*a* of the electronic device 100 according to an embodiment may include an opening 221, a second switch 225, a $P_4$ point corresponding to a ground point, and a $P_5$ point corresponding to a power feeding point, and the certain region 1300*b* of the electronic device 100 according to another embodiment may include an opening 221, the first switch 224, the second switch 225, a $P_3$ point and a $P_4$ point corresponding to a ground point, and/or a $P_5$ point corresponding to a power feeding point.

According to an embodiment, in view (a) of FIG. 13, the electronic device 100 according to an embodiment may include a first conductive member 1350 or a second conductive member 1360. In an example, the first conductive member 1350 may be formed along a third periphery 121. In another example, the second conductive member 1360 may be formed along a fourth periphery 122. In still another example, the first conductive member 1350 and the second conductive member 1360 may be electrically separated from each other by a seventh segment 223.

According to an embodiment, an explanation of an eighth segment 241 in view (b) of FIG. 13 is substantially the same as the explanation of a corresponding segment in FIG. 4 and hence is omitted.

According to an embodiment, an explanation of a sixth segment 222, a seventh segment 223, the eighth segment 241, a sixth conductive portion 190, a seventh conductive portion 200 or an eighth conductive portion 210 in view (b) of FIG. 13 is substantially the same as the explanations of corresponding elements in FIGS. 3 and 4 and hence is omitted.

According to an embodiment, a path 1310 of a first radiation current may be formed along the opening 221 which is formed adjacent to the first conductive member 1350 included in the certain region 1300*a* of the electronic device 100 according to an embodiment. In an example, the opening 221 included in the certain region 1300*a* of the electronic device 100 according to an embodiment may not include the first switch 224.

According to an embodiment, power may be fed through the $P_5$ point of the certain region 1300*a* of the electronic device 100 according to an embodiment, and the path 1310 of the first radiation current or a path 1320 of a second radiation current may be formed by feeding power through the $P_5$ point. In an example, an electrical length of the path 1320 of the second radiation current may be changed according to switching of the second switch 225.

According to an embodiment, the path 1310 of the first radiation current and the path 1320 of the second current which are formed in the certain region 1300*a* of the electronic device 100 according to an embodiment may not be formed independently. For example, the path 1310 of the first radiation current and the path 1320 of the second radiation current may cause resonances to be generated in different frequency bands, respectively.

According to an embodiment, the path 1310 of the first radiation current and the path 1320 of the second radiation current which are formed in the certain region 1300*a* of the electronic device 100 according to an embodiment may overlap each other in a corner region where the third periphery 121 and the fourth periphery 122 overlap each other, and hence, the path 1310 of the first radiation current and the path 1320 of the second radiation current may influence each other. For example, the path 1310 of the first radiation current and the path 1320 of the second radiation current may cause resonances to be additionally generated in different frequency bands.

According to an embodiment, the extent to which electrical paths overlap each other may be reduced due to the seventh conductive portion 200 in the certain region 1300*b* of the electronic device 100 according to an embodiment, and accordingly, an additional resonance of a resonant frequency band may be generated.

According to an embodiment, when the electrical length of the path 1320 of the second radiation current is changed, the resonance frequency may be shifted, but there may be no influence of the second conductive member 1360 on the antenna radiation efficiency.

According to an embodiment, a path 1330 of a third radiation current may be formed adjacent to the opening 221 of the certain region 1300*b* of the electronic device 100 according to an embodiment.

According to an embodiment, the length of the path 1330 of the third radiation current may be changed according to switching of the first switch 224 included in the opening 221. In an example, when the first switch 224 is in the OFF state, the path 1330 of the third radiation current may be formed over at least part of the opening 221 formed along the third periphery 121. In another example, when the first switch 224 is in the ON state, the path 1330 of the third radiation current may be formed from one end of the opening 221 to a part of the opening 221 where the first switch 224 is positioned.

According to an embodiment, a path 1340 of a fourth radiation current may be formed in a certain region of the fourth periphery 122 along the fourth periphery 122. In an example, the fourth periphery 122 may be fed with power through the $P_5$ point, such that the path 1340 of the fourth radiation current is formed in a certain region of the fourth periphery 122.

According to an embodiment, the length of the path 1340 of the fourth radiation current may be changed according to switching of the second switch 225 included in the fourth periphery 122. In an example, when the second switch 225 is in the OFF state, the path 1340 of the fourth radiation current may be formed along the fourth periphery 122. For example, the path 1340 of the fourth radiation current may be formed in a direction perpendicular to the third periphery 121 along a portion of the opening 221 that is formed in parallel with the fourth periphery 122. In another example, when the second switch 225 is in the ON state, the path 1340 of the fourth radiation current may be formed from one end of the fourth periphery 122 near the $P_5$ point to a portion of the fourth periphery 122 where the second switch 225 is positioned.

According to another embodiment, the path 1330 of the third radiation current and the path 1340 of the fourth radiation current which are formed in the certain region 1300*b* of the electronic device 100 according to an embodiment may be independently formed by switching of the first switch 224. For example, when the first switch 224 is in the ON state, the path 1330 of the third radiation current may substantially disappear. For example, when the first switch 224 is in the ON state, an existing current may disappear and a separate flow in a closed loop shape may be formed.

According to an embodiment, when the electrical length of the path 1340 of the fourth radiation current is changed, the resonant frequency may be shifted. For example, when the first switch 224 is in the ON state, the electrical path of the path 1340 of the fourth radiation current may be changed.

According to an embodiment, in view (b) of FIG. 13, the seventh conductive portion 200 may be electrically separated from the sixth conductive portion 190 and the eighth conductive portion 210 by the sixth segment 222 and the seventh segment 223, respectively, thereby operating as a floating conductive portion. In an example, the floating conductive portion may be formed in the certain region 1300*b* of the electronic device 100 according to an embodiment, so that antenna radiation efficiency in the certain region 1300*b* is enhanced compared to antenna radiation efficiency in the certain region 1300*a* according to an embodiment.

According to an embodiment, in view (a) of FIG. 13, there may exist only the seventh segment 223 and the path 1320 of the second radiation current may be formed to the seventh segment 223. Accordingly, an area of the radiator may be small compared to the path 1340 of the fourth radiation current formed in view (b) of FIG. 13. In addition, when the path 1340 of the first radiation current and the path 1320 of the second radiation current overlap each other, antenna radiation may occur only in the seventh segment 223 and antenna radiation efficiency may be degraded.

According to an embodiment, in view (b) of FIG. 13, the seventh conductive portion 200 may operate as an antenna radiator and the sixth segment 222 may form an end of the antenna radiator, such that the area of the antenna radiator is formed to one surface of the third periphery 121. Accordingly, the path 1340 of the fourth radiation current may have a larger antenna radiation area than the path 1320 of the second radiation current, so that antenna radiation efficiency is enhanced.

According to an embodiment, a floating conductive portion (for example, the seventh conductive portion 200 of FIG. 13) may operate as an antenna radiator. In an example, a length of the floating conductive portion may be substantially the same as a half of a wavelength of a resonance formed by the path 1330 of the third radiation current or the path 1340 of the fourth radiation current. In another example, when the length of the floating conductive portion is longer than the half of the wavelength of the resonance formed by the path 1330 of the third radiation current or the path 1340 of the fourth radiation current, antenna radiation performance may be degraded.

According to an embodiment, a support member 1300*a*-1 may be formed in the certain region 1300*a* of the electronic device 100 according to an embodiment. In an example, the opening 221 may be formed on the support member 1300*a*-1 in the certain region 1300*a* of the electronic device 100 according to an embodiment. In another example, the support member 1300*a*-1 may support the first conductive member 1350 and the second conductive member 1360.

Figure 14A:
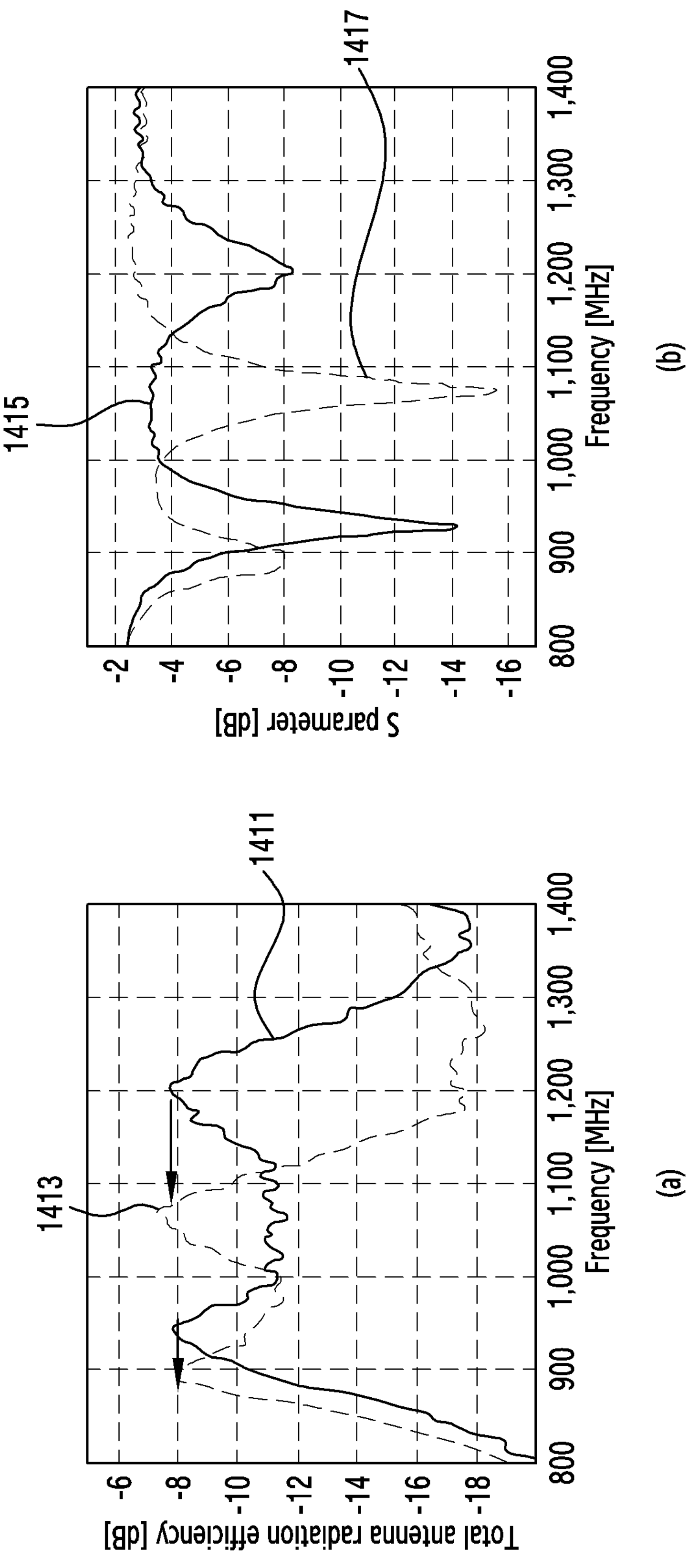
FIG. 14A is a view illustrating a total antenna radiation efficiency graph and an S parameter graph of an electronic device including a structure of a certain region according to an embodiment of the electronic device illustrated in view (a) of FIG. 13.
Figure 14B:
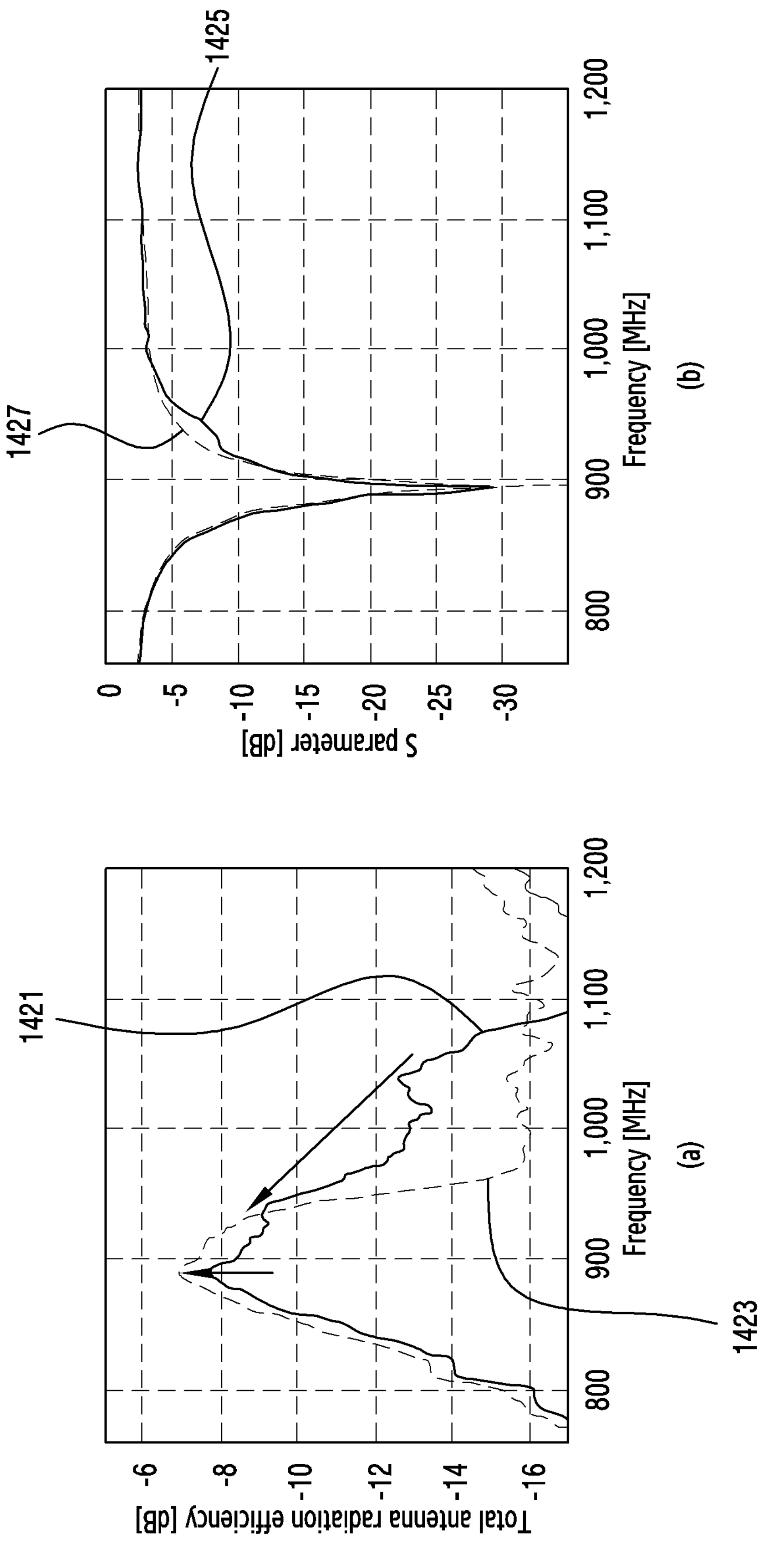
FIG. 14B is a view illustrating a total antenna radiation efficiency graph and an S parameter graph of an electronic device including a structure of a certain region according to an embodiment of the electronic device illustrated in view (b) of FIG. 13.

FIG. 14A illustrates a total antenna radiation efficiency graph and an S parameter graph of the electronic device including the certain region 1300*a* of the electronic device 100 according to an embodiment as shown in view (a) of FIG. 13. FIG. 14B illustrates a total antenna radiation efficiency graph and an S parameter graph of the electronic device 100 including the structure of the certain region 1300*b* of the electronic device 100 according to an embodiment as shown in view (b) of FIG. 13.

FIG. 14A may be understood as graphs regarding the total antenna radiation efficiency and the S parameter obtained by the path 1310 of the first radiation current and the path 1320 of the second radiation current formed in the certain region 1300*a* of the electronic device 100 according to an embodiment as shown in view (a) of FIG. 13. FIG. 14B may be understood as graphs regarding the total antenna radiation efficiency and the S parameter obtained by the path 1330 of the third radiation current and the path 1340 of the fourth radiation current formed in the certain region 1300*b* of the electronic device 100 according to an embodiment as shown in view (b) of FIG. 13.

Referring to the total antenna radiation efficiency graph, it may be understood that a resonance is generated in a frequency band of a point of high total antenna radiation efficiency rather than in neighboring frequency bands, and, referring to the S parameter graph, it may be understood that a resonance is generated in a frequency band of a point of a low S parameter rather than in neighboring frequency bands.

Referring to FIGS. 14A and 14B, a resonant frequency formed in the electronic device including the structure of 1300*a* of FIG. 13 and the electronic device 100 may be shifted according to a change in the electrical length of the opening 221.

Referring to FIG. 14A, according to an embodiment, the total antenna radiation efficiency graph may be changed from 1411 to 1413 by adjusting the length of the path 1310 of the first radiation current formed in the opening 221 in the electronic device including the structure of 1300*a* of FIG. 13, and the S parameter graph may be changed from 1415 to 1417. For example, a frequency band formed by the path 1310 of the first radiation current may be shifted from about 1,200 MHz to a frequency band between about 1,050 MHz and 1,100 MHz by changing the length of the path 1310 of the first radiation current formed in the opening 221 of the electronic device including the structure of 1300*a* of FIG. 13, and a frequency band formed by the path 1320 of the second radiation current may be shifted from a frequency band between about 920 MHz and 950 MHz to a frequency band of about 900 MHz.

According to an embodiment, the length of the path 1310 of the first radiation current formed in the opening 221 of the electronic device including the structure of 1300*a* of FIG. 13 may be changed by changing the physical length of the opening 221. For example, a length of a part of the opening 221 formed along the sixth conductive portion 190 may be increased or reduced in a direction substantially parallel to the sixth conductive portion 190.

Referring to FIG. 14B, the total antenna radiation efficiency graph may be changed from 1421 to 1423 and the S parameter graph may be changed from 1425 to 1427 by adjusting the electrical length of the path 1330 of the third radiation current formed in the opening 221 by changing a switching state of the first switch 224 in the electronic device 100 according to an embodiment. For example, when the length of the path 1330 of the third radiation current formed in the opening 221 is changed by changing the switching state of the first switch 224 in the electronic device 100, a frequency band formed by the path 1330 of the third radiation current may be shifted from a frequency band between about 1,000 MHz and about 1,050 MHz to a frequency band of about 900 MHz, and a frequency band formed by the path 1340 of the fourth radiation current may not be shifted substantially.

According to an embodiment, the total antenna radiation efficiency in at least one frequency band may be enhanced by adjusting the electrical length of the path 1330 of the third radiation current formed in the opening 221 by changing the switching state of the first switch 224 in the electronic device 100. For example, a resonant frequency may be shifted downwardly by adjusting the length of the path 1330 of the third radiation current formed in the opening 221 by changing the switching state of the first switch 224 in the electronic device 100, so that performance of a low frequency band may be enhanced. For example, when the first switch 224 of the electronic device 100 is in the ON state, the total antenna radiation efficiency achieved by the path 1340 of the fourth radiation current may be enhanced in a frequency band of about 900 MHz.

Figure 15:
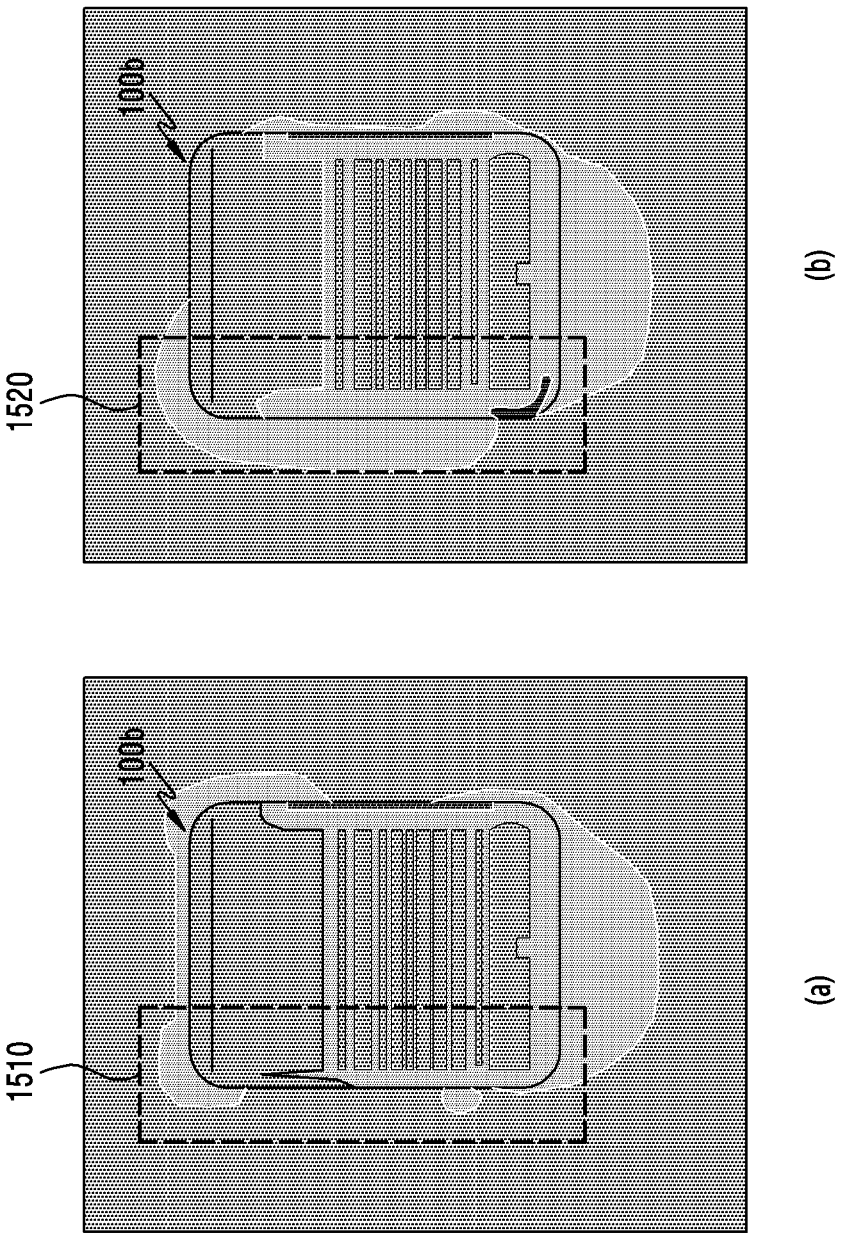
FIG. 15 is a view illustrating an electric field formed when a capacitor having a designated capacitance value is connected to a first switch in a folded state of an electronic device according to an embodiment.

FIG. 15 illustrates an electric field which is generated when a capacitor having a designated capacitance value is connected to the switch 224 in the folded state 100*b* of the electronic device 100 according to an embodiment.

Referring to the view (b) of FIG. 13, the electric field formed in the electronic device 100 may be changed when the capacitor having the designated capacitance value is connected to the first switch 224. For example, the capacitor may be connected between the first switch 224 and the one certain region 220*a* of the second housing 120.

According to an embodiment, when the capacitor having the designated capacitance value is connected to the first switch 224, a frequency band for generating a resonance in the ON state of the first switch 224 may be lowered. In an example, when the capacitor having the designated capacitance value is connected to the first switch 224, a resonant frequency band may be changed in the ON state of the first switch 224. For example, when the first switch 224 is connected with a capacitor having a value of 1.5 pF and is in the ON state, the path 1330 of the third radiation current may form a resonance frequency band of about 0.7 GHz.

According to an embodiment, when the electronic device 100 is in the folded state 100*b* and the first switch 224 is in the ON state and is connected with the capacitor having the designated capacitance value, an electric field 1520 caused by the path 1330 of the third radiation current may generate a stronger field than an electric field 1510 caused by the path 1330 of the third radiation current when the electronic device 100 is in the folded state 100*b* and the first switch 224 is in the ON state and is not connected with the capacitor.

Figure 16:
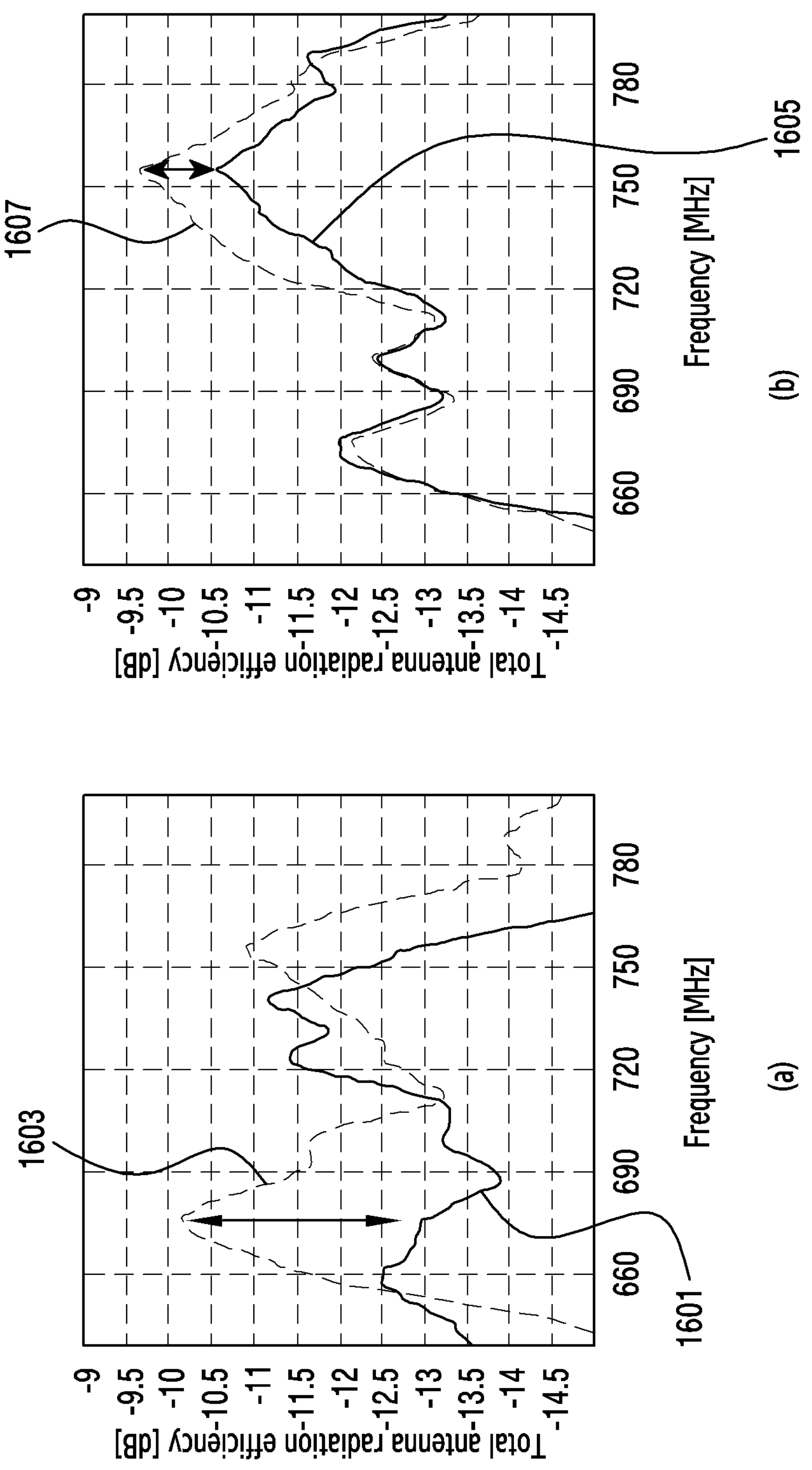
FIG. 16 is a view illustrating a total antenna radiation efficiency graph of the electronic device according to an embodiment.

FIG. 16 illustrates a total antenna radiation efficiency graph of the electronic device 100 according to an embodiment.

Referring to FIG. 16, the total antenna radiation efficiency of the electronic device 100 may be changed according to switching of the first switch 224.

According to an embodiment, when a resonant frequency band is formed from 720 MHz to 750 MHz by using the second switch 225, an element having a designated value is connected to the first switch 224, and the first switch 224 is switched to go into the ON state, the graph may change from 1601 to 1603. For example, the element may include a capacitor. In an example, when the path 1330 of the third radiation current or the path 1340 of the fourth radiation current is formed in a frequency band of about 600 MHz, antenna radiation efficiency may be enhanced by about 3 dB in a frequency band between about 660 MHz and about 690 MHz according to switching of the first switch 224.

According to an embodiment, when a resonant frequency band is formed with 750 MHz by using the second switch 225, an element having a designated value is connected to the first switch 224, and the first switch 224 is switched to go into the ON state, the graph may change from 1605 to 1607. For example, the element may include a capacitor. In an example, when the path 1330 of the third radiation current or the path 1340 of the fourth radiation current is formed in a frequency band of about 700 MHz, antenna radiation efficiency may be enhanced by about 1 dB in a frequency band between about 750 MHz and about 760 MHz according to switching of the first switch 224.

According to an embodiment which will be described below, certain regions 1710, 1720, 1730, 1810, 1820, 1830, 1910, 1920 of the second housing 120 including a floating conductive portion may be understood as various examples of the certain region 1300*b* of the electronic device 100 according to an embodiment as shown in view (b) of FIG. 13. Accordingly, an explanation of operations of the respective components illustrated in FIG. 13 is omitted.

Figure 17A:
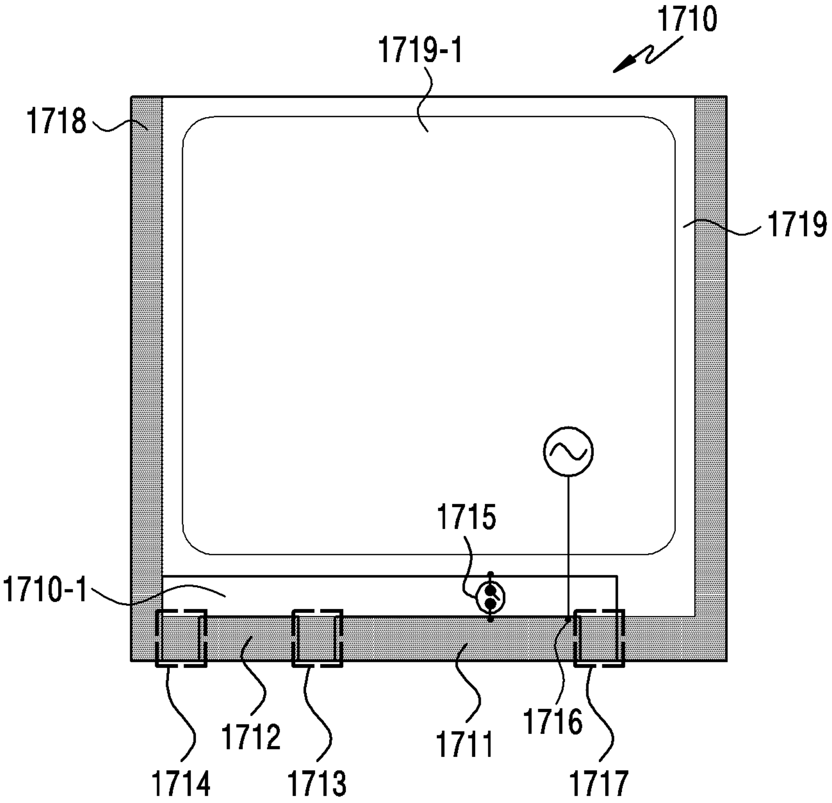
FIG. 17A is a view illustrating a certain region of a first housing including a floating conductive portion according to an embodiment.

FIG. 17A illustrates a certain region 1710 of a second housing 120 including a floating conductive portion according to an embodiment.

Referring to FIG. 17A, an opening 1710-1, a first conductive member 1711, a second conductive member 1712, a first segment 1713, a second segment 1714, a third segment 1717, a switch 1715, or a power feeding point 1716 may be formed in the certain region 1710 of the second housing 120 according to an embodiment. In an example, the opening 1710-1, the first conductive member 1711, the second conductive member 1712, the first segment 1713, the second segment 1714, the third segment 1717, the switch 1715, or the power feeding point 1716 may be understood as corresponding to the opening 221, the eighth conductive portion 210, the seventh conductive portion 200, the seventh segment 223, the sixth segment 222, the eighth segment 241, the second switch 225, or the $P_5$ point of FIG. 4, respectively.

According to an embodiment, the certain region 1710 of the second housing 120 may include a conductive portion 1718 which forms an outline of the second housing 120, a conductive support member 1719 which is formed in the second housing 120, or a printed circuit board 1719-1. In an example, the first conductive member 1711, the second conductive member 1712, the first segment 1713, the second segment 1714, the third segment 1717 may be disposed in at least part of the conductive portion 1718. In another example, the printed circuit board 1719-1 may be disposed in a certain region of the conductive support member 1719, and the conductive support member 1719 may support the printed circuit board 1719-1.

According to an embodiment, the printed circuit board 1719-1 may include a control circuit (not shown) to control the switch 1715, and a power feeding circuit (not shown) to electrically connect the power feeding point 1716.

In the following descriptions of the drawings, the conductive portion 1718, the conductive support member 1719, or the printed circuit board 1719-1 included in the electronic device 100 may be omitted.

According to an embodiment, the first segment 1713 may be formed between the first conductive member 1711 and the second conductive member 1712.

According to an embodiment, the first segment 1713 and the second segment 1714 may be formed on the same periphery of the certain region 1710 of the second housing 120.

According to an embodiment, the second conductive member 1712 may be understood as the same structure as the seventh conductive portion 200 shown in FIG. 2.

According to an embodiment, the opening 1710-1 may be formed by being filled with a nonconductive material. For example, the opening 1710-1 may be filled with an injected nonconductive material to be formed of the same material as the first segment 1713, the second segment 1714, the third segment 1717.

Figure 17B:
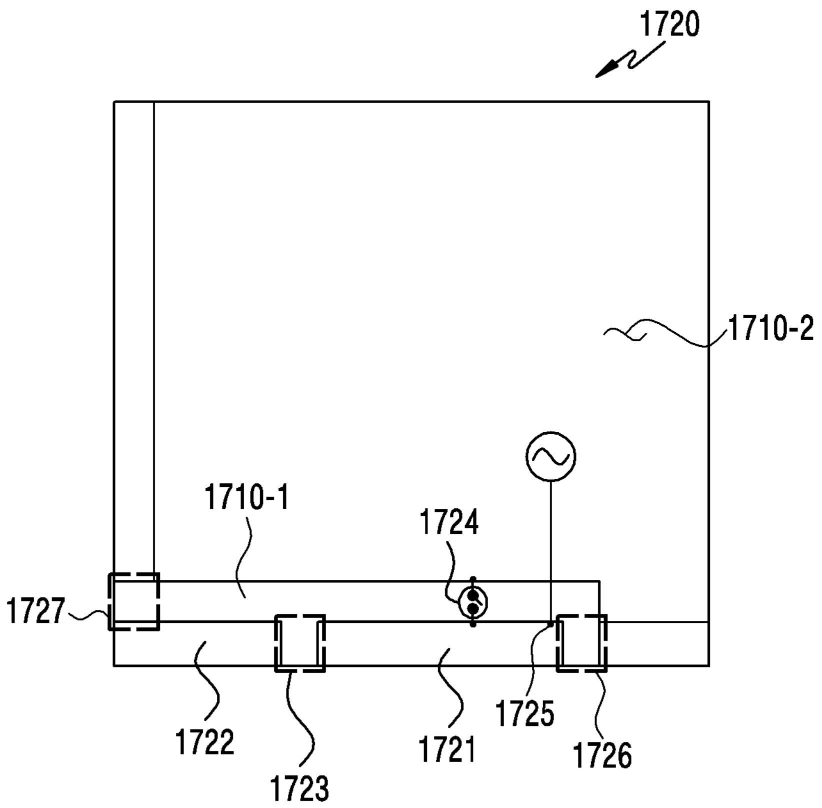
FIG. 17B is a view illustrating a certain region of a first housing including a floating conductive portion according to an embodiment.

FIG. 17B illustrates a certain region 1720 of a second housing 120 including a floating conductive portion according to an embodiment.

Referring to FIG. 17B, a first conductive member 1721, a second conductive member 1722, a first segment 1723, a second segment 1726, a third segment 1727, a switch 1724, or a power feeding point 1725 may be formed in the certain region 1720 of the second housing 120 according to an embodiment. In an example, the first conductive member 1721, the second conductive member 1722, the first segment 1723, the second segment 1726, the third segment 1727, the switch 1724 or the power feeding point 1725 may be understood as corresponding to the eighth conductive portion 210, the seventh conductive portion 200, the seventh segment 223, the eighth segment 241, the sixth segment 222, the second switch 225, or the $P_5$ point of FIG. 4, respectively.

According to an embodiment, the first segment 1723 may be formed between the first conductive member 1721 and the second conductive member 1722.

According to an embodiment, an opening (not shown) may be extended from one end of the second segment 1726 to one end of the third segment 1727 adjacent to the first segment 1723.

According to an embodiment, an opening 1710-1 and a support member 1710-2 may be formed in the certain region 1720 of the second housing 120 according to an embodiment. In an example, the opening 1710-1 may be formed on the support member 1710-2. In another example, the support member 1710-2 may support the first conductive member 1721 and the second conductive member 1722.

Figure 17C:
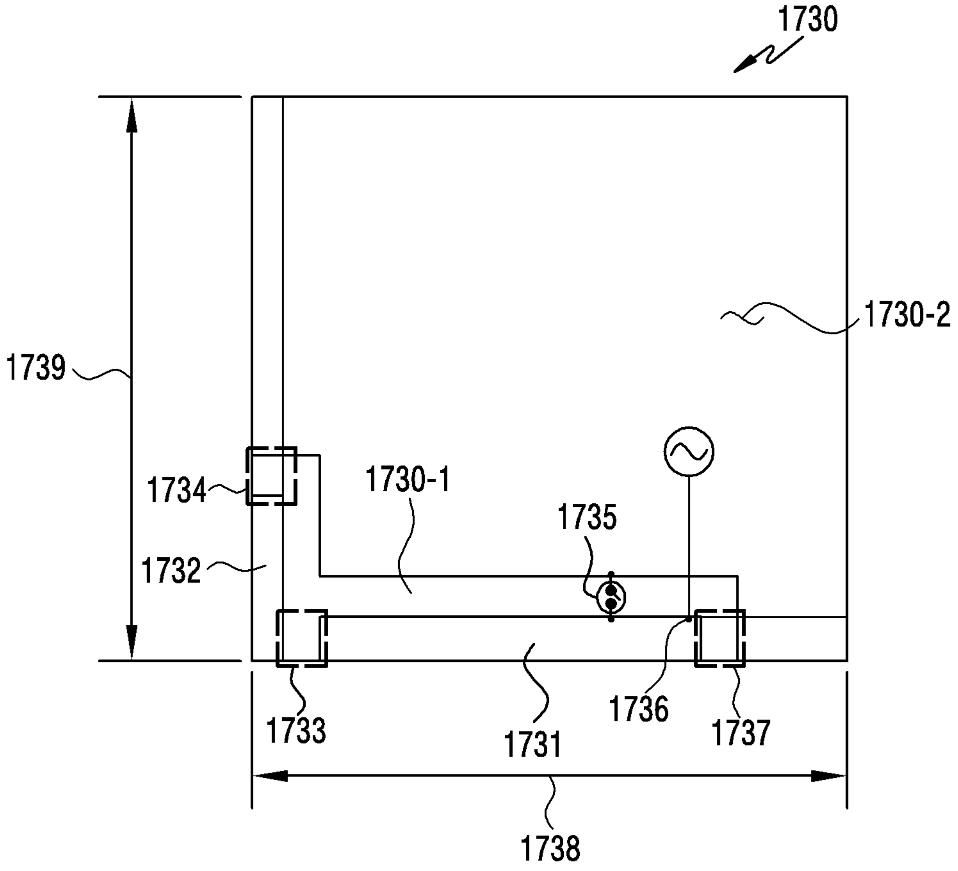
FIG. 17C is a view illustrating a certain region of a first housing including a floating conductive portion according to an embodiment.

FIG. 17C illustrates a certain region 1730 of a second housing 120 including a floating conductive portion according to an embodiment.

Referring to FIG. 17C, a first conductive member 1731, a second conductive member 1732, a first segment 1733, a second segment 1734, a switch 1735, or a power feeding point 1736 may be formed in the certain region 1730 of the second housing 120 according to an embodiment. In an example, the first conductive member 1731, the second conductive member 1732, the first segment 1733, the second segment 1734, a third segment 1737, the switch 1735 or the power feeding point 1736 may be understood as corresponding to the eighth conductive portion 210, the seventh conductive portion 200, the seventh segment 223, the sixth segment 222, the eighth segment 241, the second switch 225, or the $P_5$ point of FIG. 4, respectively.

According to an embodiment, the first segment 1733 may be formed between the first conductive member 1731 and the second conductive member 1732.

According to an embodiment, the second conductive member 1732 may be formed on a first periphery 1738 to be extended to a second periphery 1739 along the first periphery 1738.

According to an embodiment, an opening 1730-1 may be formed between the first conductive member 1731 and a support member 1730-2 and between the second conductive member 1732 and the support member 1730-2. One end of the opening 1730-1 may be connected with the third segment 1737, and the other end of the opening 1730-1 may be connected with the second segment 1734. The first segment 1733 may be connected with a portion of the opening 1730-1 that is substantially parallel to the second periphery 1739.

According to an embodiment, the opening 1730-1 and the support member 1730-2 may be formed in the certain region 1730 of the second housing 120 according to an embodiment. In an example, the opening 1730-1 may be formed on the support member 1730-2. In another example, the support member 1730-2 may support the first conductive member 1731 and the second conductive member 1732.

Figure 18A:
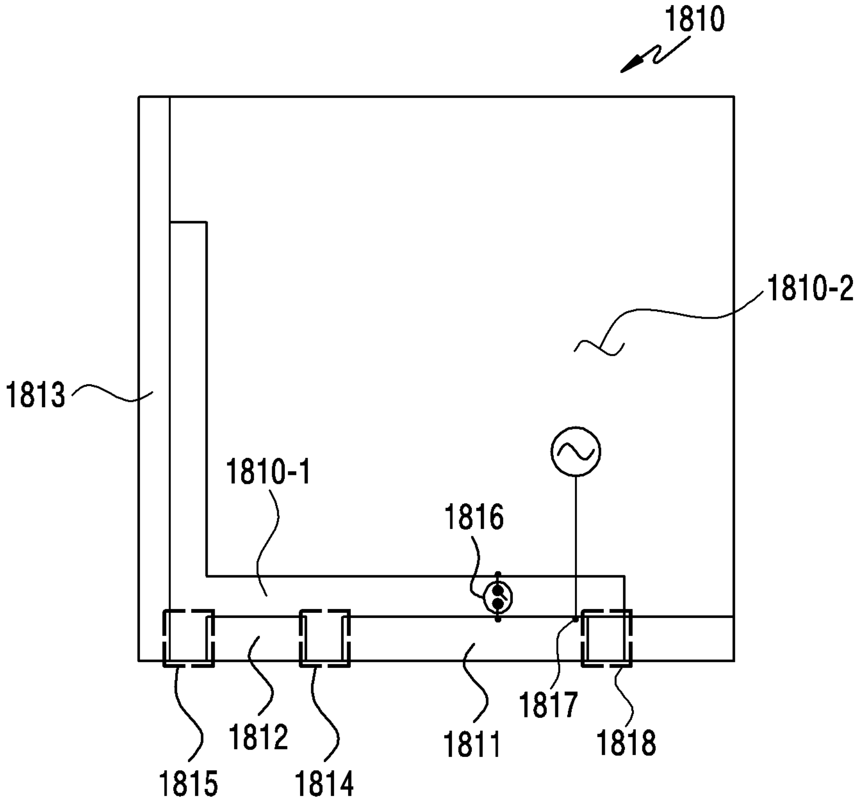
FIG. 18A is a view illustrating a certain region of a first housing including a floating conductive portion according to an embodiment.

FIG. 18A illustrates a certain region 1810 of a second housing 120 including a floating conductive portion according to an embodiment.

Referring to FIG. 18A, a first conductive member 1811, a second conductive member 1812, a third conductive member 1813, a first segment 1814, a second segment 1815, a third segment 1818, a switch 1816, or a power feeding point 1817 may be formed in the certain region 1810 of the second housing 120 according to an embodiment. In an example, the first conductive member 1811, the second conductive member 1812, the third conductive member 1813, the first segment 1814, the second segment 1815, the third segment 1818, the switch 1816 or the power feeding point 1817 may be understood as corresponding to the eighth conductive portion 210, the seventh conductive portion 200, the sixth conductive portion 190, the seventh segment 223, the sixth segment 222, the eighth segment 241, the second switch 225, or the $P_5$ point of FIG. 4, respectively.

According to an embodiment, the first segment 1814 may be formed between the first conductive member 1811 and the second conductive member 1812. In another example, the second segment 1815 may be formed between the second conductive member 1812 and the third conductive member 1813.

According to an embodiment, the first segment 1814 and the second segment 1815 may be formed on the same periphery of the certain region 1810 of the second housing 120.

According to an embodiment, the first conductive member 1811 and the second conductive member 1812 may be formed on the same periphery of the certain region 1810 of the second housing 120, and the third conductive member 1813 may be formed on a periphery that is perpendicular to the periphery of the certain region 1810 of the second housing 120 on which the first conductive member 1811 and the second conductive member 1812 are formed.

According to an embodiment, an opening 1810-1 and a support member 1810-2 may be formed in the certain region 1810 of the second housing 120 according to an embodiment. In an example, the opening 1810-1 may be formed on the support member 1810-2. In another example, the support member 1810-2 may support the first conductive member 1811 and the second conductive member 1812.

Figure 18B:
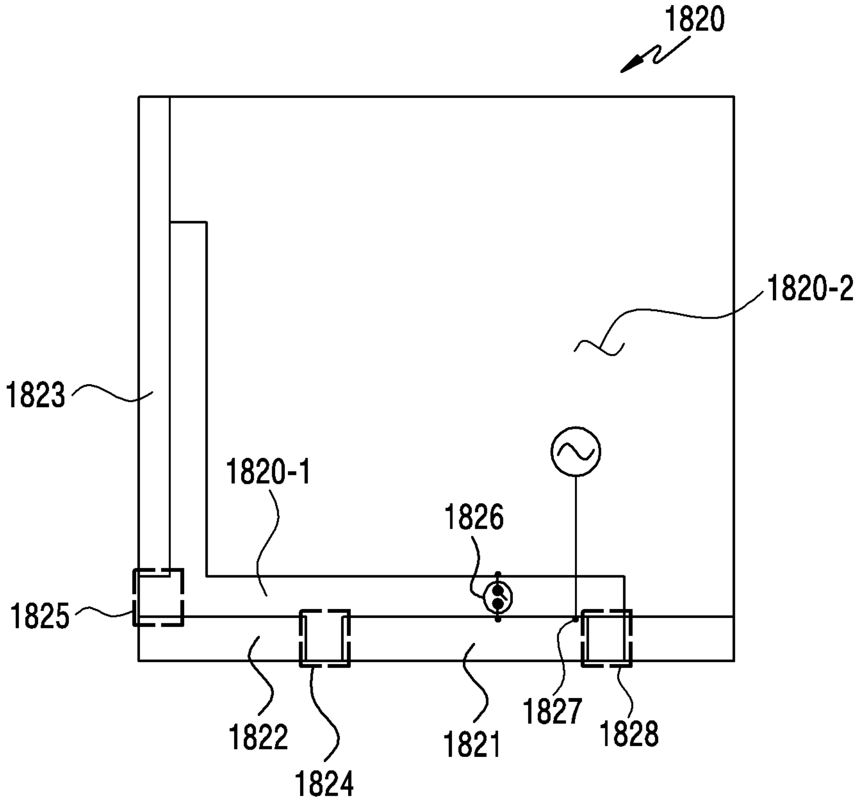
FIG. 18B is a view illustrating a certain region of a first housing including a floating conductive portion according to an embodiment.

FIG. 18B illustrates a certain region 1820 of a second housing 120 including a floating conductive portion according to an embodiment.

Referring to FIG. 18B, a first conductive member 1821, a second conductive member 1822, a third conductive member 1823, a first segment 1824, a second segment 1825, a third segment 1828, a switch 1826, or a power feeding point 1827 may be formed in the certain region 1820 of the second housing 120 according to an embodiment. In an example, the first conductive member 1821, the second conductive member 1822, the third conductive member 1823, the first segment 1824, the second segment 1825, the third segment 1828, the switch 1826 or the power feeding point 1827 may be understood as corresponding to the eighth conductive portion 210, the seventh conductive portion 200, the sixth conductive portion 190, the seventh segment 223, the sixth segment 222, the eighth segment 241, the second switch 225, or the $P_5$ point of FIG. 4, respectively.

According to an embodiment, the first segment 1824 may be formed between the first conductive member 1821 and the second conductive member 1822. In another example, the second segment 1825 may be formed between the second conductive member 1822 and the third conductive member 1823.

According to an embodiment, the first segment 1824 and the second segment 1825 may be formed on different peripheries of the certain region 1820 of the second housing 120.

According to an embodiment, the first conductive member 1821 and the second conductive member 1822 may be formed on the same periphery of the certain region 1820 of the second housing 120, and the third conductive member 1823 may be formed on a periphery that is substantially perpendicular to the periphery of the certain region 1820 of the second housing 120 on which the first conductive member 1821 and the second conductive member 1822 are formed.

According to an embodiment, an opening 1820-1 and a support member 1820-2 may be formed in the certain region 1820 of the second housing 120 according to an embodiment. In an example, the opening 1820-1 may be formed on the support member 1820-2. In another example, the support member 1820-2 may support the first conductive member 1821, the second conductive member 1822, and the third conductive member 1823.

Figure 18C:
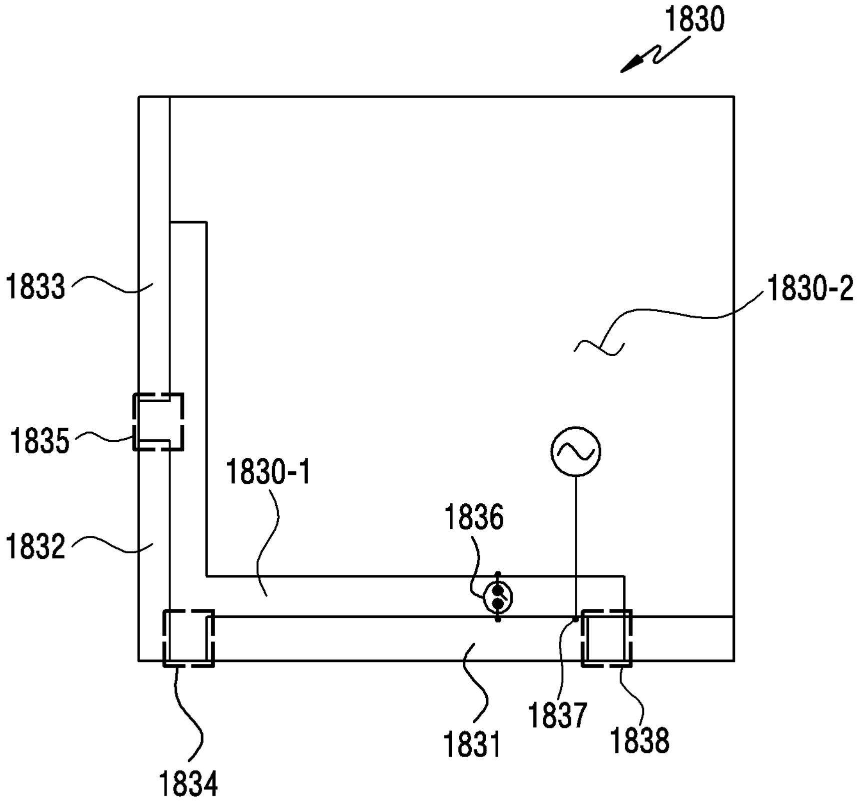
FIG. 18C is a view illustrating a certain region of a first housing including a floating conductive portion according to an embodiment.

FIG. 18C illustrates a certain region 1830 of a second housing 120 including a floating conductive portion according to an embodiment.

Referring to FIG. 18C, a first conductive member 1831, a second conductive member 1832, a third conductive member 1833, a first segment 1834, a second segment 1835, a third segment 1838, a switch 1836, or a power feeding point 1837 may be formed in the certain region 1830 of the second housing 120 according to an embodiment. In an example, the first conductive member 1831, the second conductive member 1832, the third conductive member 1833, the first segment 1834, the second segment 1835, the third segment 1838, the switch 1836 or the power feeding point 1837 may be understood as corresponding to the eighth conductive portion 210, the seventh conductive portion 200, the sixth conductive portion 190, the seventh segment 223, the sixth segment 222, the eighth segment 241, the second switch 225, or the $P_5$ point of FIG. 4, respectively.

According to an embodiment, the first segment 1834 may be formed between the first conductive member 1831 and the second conductive member 1832. In another example, the second segment 1835 may be formed between the second conductive member 1832 and the third conductive member 1833.

According to an embodiment, the first segment 1834 and the second segment 1835 may be formed on different peripheries of the certain region 1830 of the second housing 120.

According to an embodiment, the second conductive member 1832 and the third conductive member 1833 may be formed on the same periphery of the certain region 1830 of the second housing 120, and the first conductive member 1831 may be formed on a periphery that is perpendicular to the periphery of the certain region 1830 of the second housing 120 on which the second conductive member 1832 and the third conductive member 1833 are formed.

According to an embodiment, an opening 1830-1 and a support member 1830-2 may be formed in the certain region 1830 of the second housing 120 according to an embodiment. In an example, the opening 1830-1 may be formed on the support member 1830-2. In another example, the support member 1830-2 may support the first conductive member 1831, the second conductive member 1832, and the third conductive member 1833.

Figure 19A:
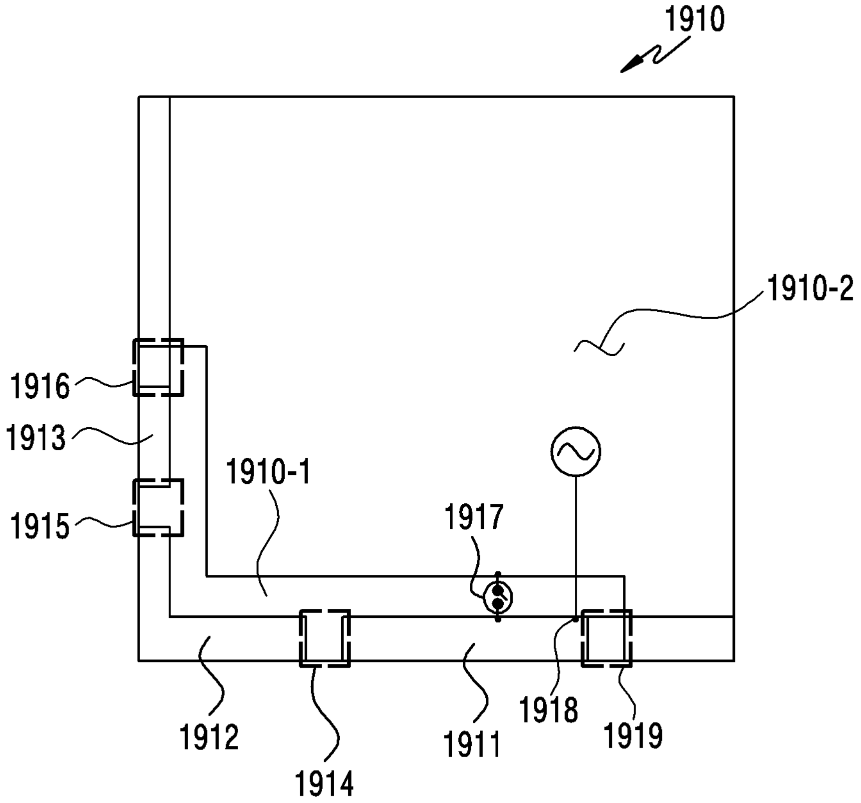
FIG. 19A is a view illustrating a certain region of a first housing including a floating conductive portion according to an embodiment.

FIG. 19A illustrates a certain region 1910 of a second housing 120 including a floating conductive portion according to an embodiment.

Referring to FIG. 19A, a first conductive member 1911, a second conductive member 1912, a third conductive member 1913, a first segment 1914, a second segment 1915, a third segment 1916, a fourth segment 1919, a switch 1917, or a power feeding point 1918 may be formed in the certain region 1910 of the second housing 120 according to an embodiment. In an example, the first conductive member 1911, the second conductive member 1912, the third conductive member 1913, the first segment 1914, the second segment 1915, the fourth segment 1919, the switch 1917 or the power feeding point 1918 may be understood as corresponding to the eighth conductive portion 210, the seventh conductive portion 200, the sixth conductive portion 190, the seventh segment 223, the sixth segment 222, the eighth segment 241, the second switch 225, or the $P_5$ point of FIG. 4, respectively. In another example, the third segment 1916 may be positioned at one end of the third conductive member 1913 to electrically block between the third conductive member 1913 and another conductive member.

According to an embodiment, the first segment 1914 may be formed between the first conductive member 1911 and the second conductive member 1912. In another example, the second segment 1915 may be formed between the second conductive member 1912 and the third conductive member 1913.

According to an embodiment, the first conductive member 1911 and the third conductive member 1913 may be formed on different peripheries of the certain region 1910 of the second housing 120.

According to an embodiment, the second conductive member 1912 may be formed over different peripheries of the certain region 1910 of the second housing 120. For example, the second conductive member 1912 may be formed over the periphery on which the first conductive member 1911 is formed and the periphery on which the third conductive member 1913 is formed.

According to an embodiment, the second segment 1915 and the third segment 1916 may be formed on the same periphery, and may be formed on a periphery different from the first segment 1914.

According to an embodiment, an opening 1910-1 and a support member 1910-2 may be formed in the certain region 1910 of the second housing 120 according to an embodiment. In an example, the opening 1910-1 may be formed on the support member 1910-2. In another example, the support member 1910-2 may support the first conductive member 1911, the second conductive member 1912, and the third conductive member 1913.

Figure 19B:
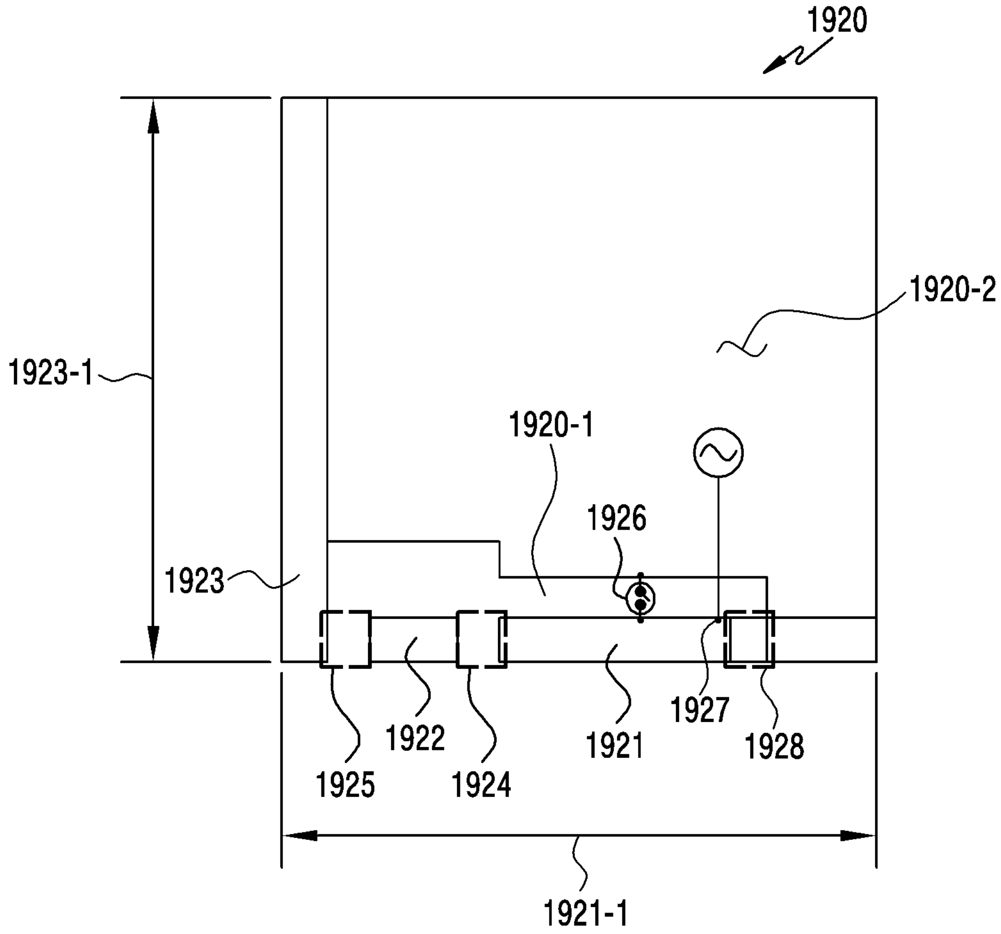
FIG. 19B is a view illustrating a certain region of a first housing including a floating conductive portion according to an embodiment.

FIG. 19B illustrates a certain region 1920 of a second housing 120 including a floating conductive portion according to an embodiment.

Referring to FIG. 19B, a first conductive member 1921, a second conductive member 1922, a third conductive member 1923, a first segment 1924, a second segment 1925, a third segment 1928, a switch 1926, or a power feeding point 1927 may be formed in the certain region 1920 of the second housing 120 according to an embodiment. In an example, the first conductive member 1921, the second conductive member 1922, the third conductive member 1923, the first segment 1924, the second segment 1925, the third segment 1928, the switch 1926 or the power feeding point 1927 may be understood as corresponding to the eighth conductive portion 210, the seventh conductive portion 200, the sixth conductive portion 190, the seventh segment 223, the sixth segment 222, the eighth segment 241, the second switch 225, or the $P_5$ point of FIG. 4, respectively.

According to an embodiment, the first segment 1924 may be formed between the first conductive member 1921 and the second conductive member 1922. In another example, the second segment 1925 may be formed between the second conductive member 1922 and the third conductive member 1923.

According to an embodiment, the first conductive member 1921 and the second conductive member 1922 may be positioned on the same periphery of the certain region 1920 of the second housing 120.

According to an embodiment, the first segment 1924, the second segment 1925, and the third segment 1926 may be formed on the same periphery.

According to an embodiment, an opening 1920-1 may be connected with the first segment 1924, the second segment 1925, and the third segment 1928. The opening 1920-1 may be formed in a direction parallel to a first periphery 1921-1. The opening 1920-1 may include a portion that is extended from a position corresponding to the second conductive member 1922 in a direction parallel to a second periphery 1923-1.

According to an embodiment, the opening 1920-1 and a support member 1920-2 may be formed in the certain region 1920 of the second housing 120 according to an embodiment. In an example, the opening 1920-1 may be formed on the support member 1920-2. In another example, the support member 1920-2 may support the first conductive member 1921, the second conductive member 1922, and the third conductive member 1923.

Figure 20A:
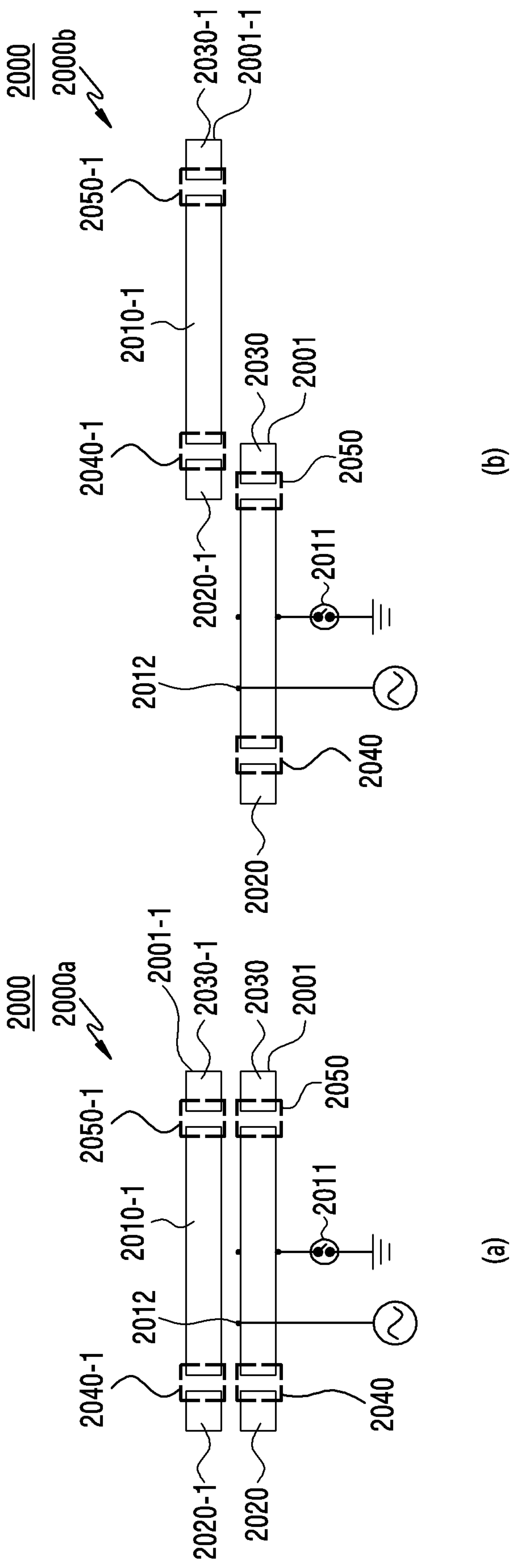
FIG. 20A is a view illustrating an electronic device according to an embodiment, which includes a floating conductive portion.
Figure 20B:
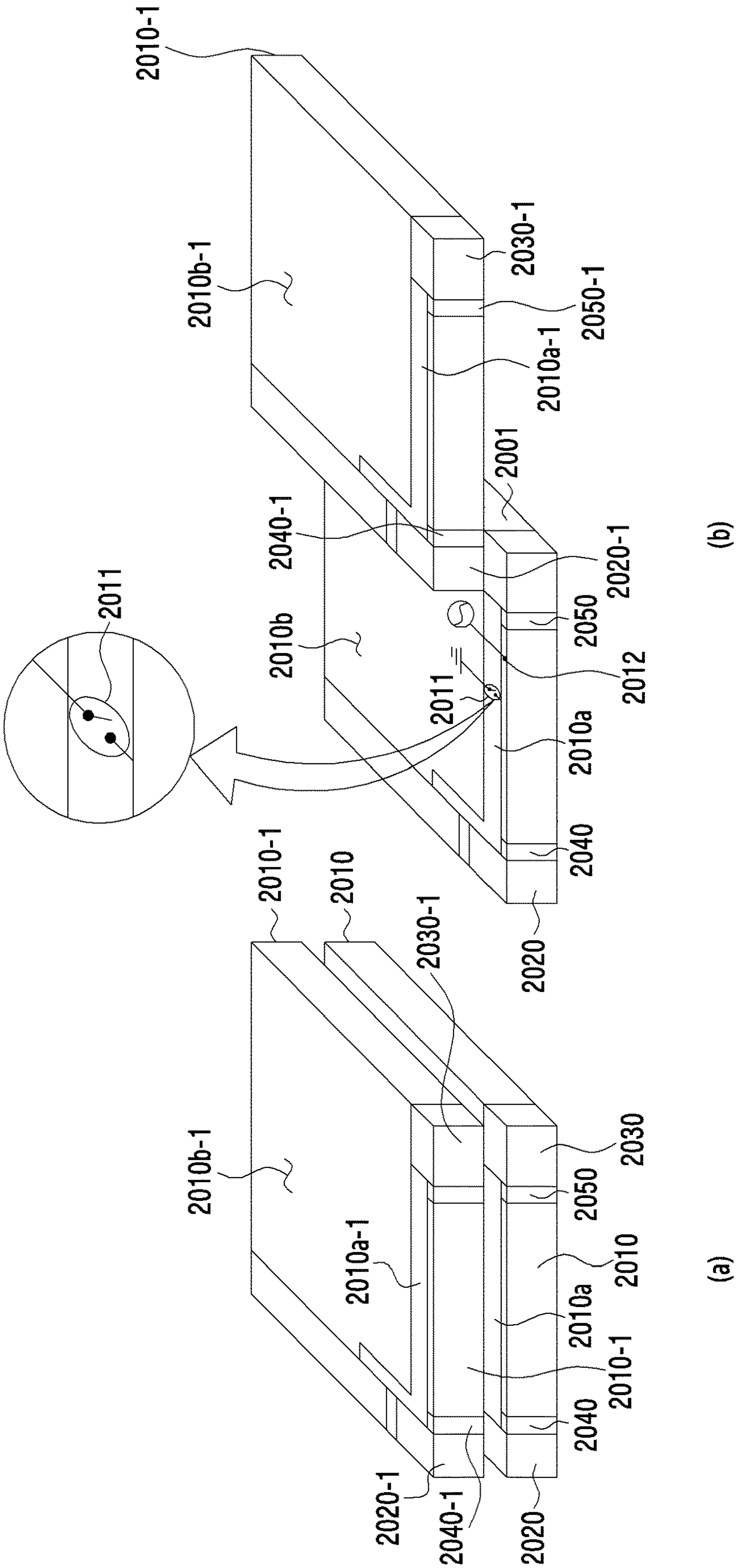
FIG. 20B is a view illustrating the electronic device according to an embodiment, which includes the floating conductive portion as viewed from a different angle from that of FIG. 20A.

FIG. 20A illustrates an electronic device 2000 including a floating conductive portion according to an embodiment. FIG. 20B illustrates the electronic device 2000 including the floating conductive portion according to an embodiment, as viewed from a different angle from the view in FIG. 20A.

Referring to FIGS. 20A and 20B, views (a) of FIGS. 20A and 20B may be understood as illustrating a case in which the electronic device 2000 is in a first state 2000*a*, and views (b) of FIGS. 20A and 20B may be understood as illustrating a case in which the electronic device 2000 is in a second state 2000*b*. In an example, the case in which the electronic device 2000 is in the first state 2000*a* may be understood as a state in which a first housing 2001-1 and a second housing 2001 of the electronic device 2000 face each other, or a state in which the electronic device 2000 is closed (i.e., completely folded), and the case in which the electronic device 2000 is in the second state 2000*b* may be understood as a state in which the first housing 2001-1 and the second housing 2001 of the electronic device 2000 do not face each other, or a state in which the electronic device 2000 is open (i.e., in a state that the first housing 2001-1 slides away from the second housing 2001).

According to an embodiment, a first conductive portion 2010, a second conductive portion 2020, a third conductive portion 2030, a first segment 2040, a second segment 2050, a switch 2011, or a power feeding point 2012 may be formed in the second housing 2001 of the electronic device 2000.

The respective components of the electronic device 2000 illustrated in FIGS. and 20B may be understood as the same components on substantially the same portions as the configuration of the electronic device 100 illustrated in FIG. 2 or 4. For example, the first conductive portion 2010, the second conductive portion 2020, the third conductive portion 2030, the first segment 2040, the second segment 2050, the switch 2011, the power feeding point 2012, the opening 2010*a*, or support member 2010*b* may be understood as substantially the same components as the eighth conductive portion 210, the seventh conductive portion 200, the ninth conductive portion 220, the seventh segment 223, the eighth segment 241, the second switch 225, the $P_5$ point, the opening 221, or the second support member 120-2 of FIG. 2 or 4.

According to an embodiment, a fourth conductive portion 2010-1, a fifth conductive portion 2020-1, a sixth conductive portion 2030-1, a third segment 2040-1, a fourth segment 2050-1, a nonconductive member 2010*a*-1, or a support member 2010*b*-1 may be formed in the first housing 2001-1 of the electronic device 2000.

According to an embodiment, when the electronic device 2000 is in the first state 2000*a*, the first conductive portion 2010, the second conductive portion 2020, the third conductive portion 2030, the first segment 2040, and the second segment 2050 may be aligned to face the fourth conductive portion 2010-1, the fifth conductive portion 2020-1, the sixth conductive portion 2030-1, the third segment 2040-1, and the fourth segment 2050-1, respectively.

Figure 21A:
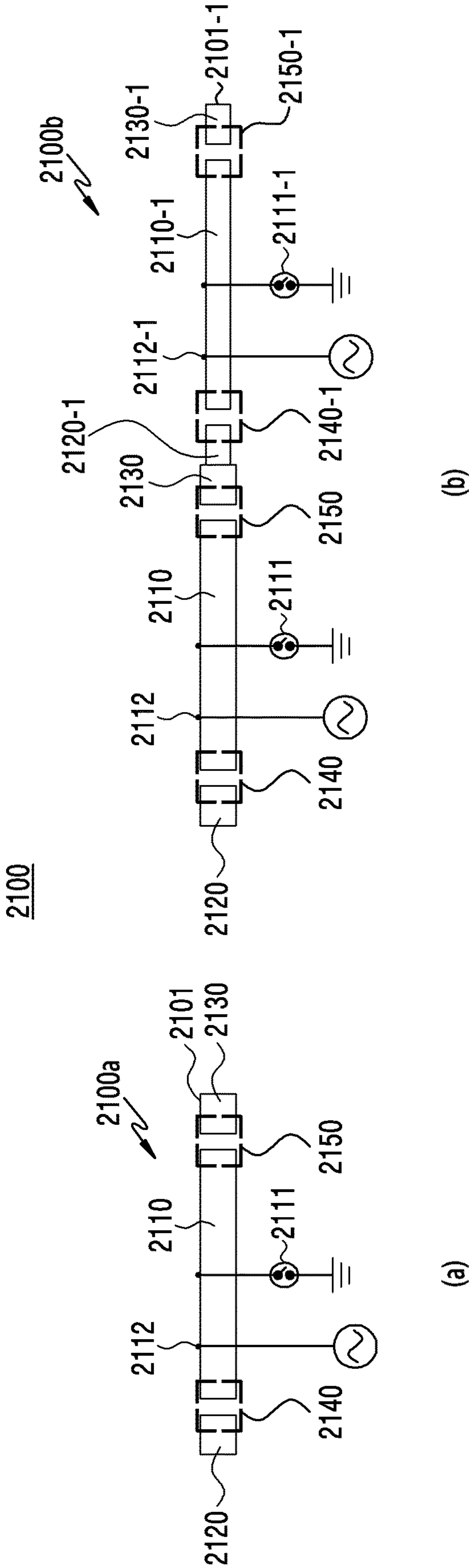
FIG. 21A is a view illustrating an electronic device according to an embodiment, which includes a floating conductive portion.
Figure 21B:
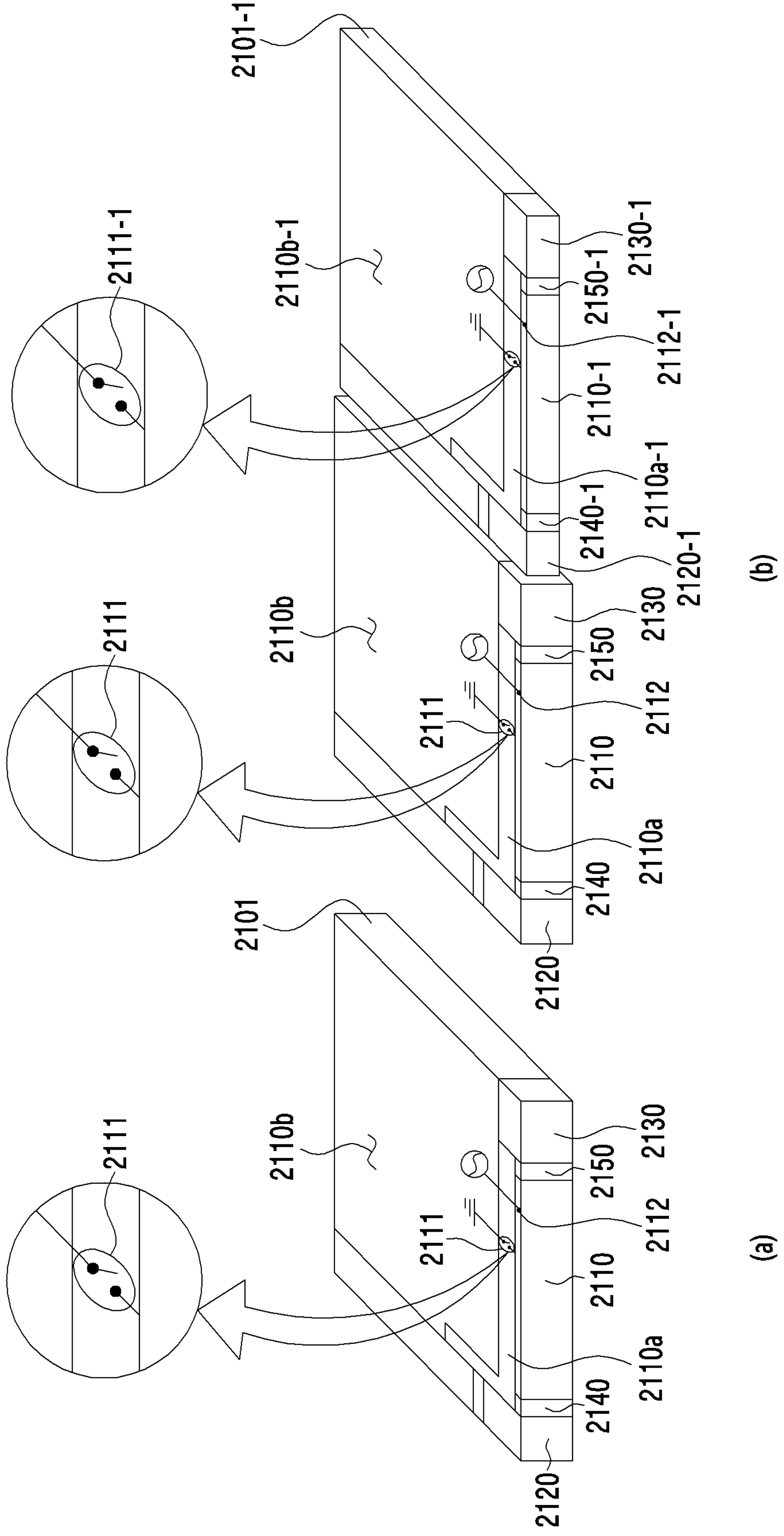
FIG. 21B is a view illustrating the electronic device according to an embodiment, which includes the floating conductive portion as viewed from a different angle from that of FIG. 21A.

FIG. 21A illustrates an electronic device 2100 including a floating conductive portion according to an embodiment. FIG. 21B illustrates the electronic device 2100 including the floating conductive portion according to an embodiment, as viewed from a different angle from the view in FIG. 21A.

Referring to FIGS. 21A and 21B, views (a) of FIGS. 21A and 21B may be understood as illustrating a case in which the electronic device 2100 is in a first state 2100*a*, and views (b) of FIGS. 21A and 21B may be understood as illustrating a case in which the electronic device 2100 is in a second state 2100*b*. In an example, the case in which the electronic device 2100 is in the first state 2100*a* may be understood as a state in which a first housing 2101 and a second housing 2101-1 of the electronic device 2100 face each other, or a state in which the electronic device 2100 is closed (i.e., in a state that the second housing 2101-1 is inside the first housing 2101), and the case in which the electronic device 2100 is in the second state 2100*b* may be understood as a state in which the first housing 2101 and the second housing 2101-1 of the electronic device 2100 do not face each other, or a state in which the electronic device 2100 is open (i.e., in a state that the second housing 2101-1 protrudes from the first housing 2101).

According to an embodiment, a first conductive portion 2110, a second conductive portion 2120, a third conductive portion 2130, a first segment 2140, a second segment 2150, a switch 2111, a power feeding point 2112, the opening or nonconductive member 2110*a*, or the support member 2110*b* may be formed in the first housing 2101 of the electronic device 2100.

The respective components of the electronic device 2100 illustrated in FIGS. 21A and 21B may be understood as the same components on substantially the same portions as the configuration of the electronic device 100 illustrated in FIG. 2 or 4. For example, the first conductive portion 2110, the second conductive portion 2120, the third conductive portion 2130, the first segment 2140, the second segment 2150, the switch 2111, or the power feeding point 2112 may be understood as substantially the same components as the eighth conductive portion 210, the seventh conductive portion 200, the ninth conductive portion 220, the seventh segment 223, the eighth segment 241, the second switch 225, or the $P_5$ point of FIG. 2 or 4.

According to an embodiment, a fourth conductive portion 2110-1, a fifth conductive portion 2120-1, a sixth conductive portion 2130-1, a third segment 2140-1, or a fourth segment 2150-1 may be formed in the second housing 2101-1 of the electronic device 2000.

According to an embodiment, when the electronic device 2100 is in the first state 2100*a*, the first conductive portion 2110, the second conductive portion 2120, the third conductive portion 2130, the first segment 2140, and the second segment 2150 may be aligned with the fourth conductive portion 2110-1, the fifth conductive portion 2120-1, the sixth conductive portion 2130-1, the third segment 2140-1, and the fourth segment 2150-1, respectively.

According to an embodiment, in view (b) of FIG. 21B, a power feeding point 2112-1 may be formed even in the fourth conductive portion 2110-1, and the power feeding point 2112-1 may be electrically connected with a switch 2111-1. In an example, the switch 2111-1 and the power feeding point 2112-1 may be understood as substantially the same components as the switch 2111 and the power feeding point 2112 formed in the first conductive portion 2110.

Figure 22:
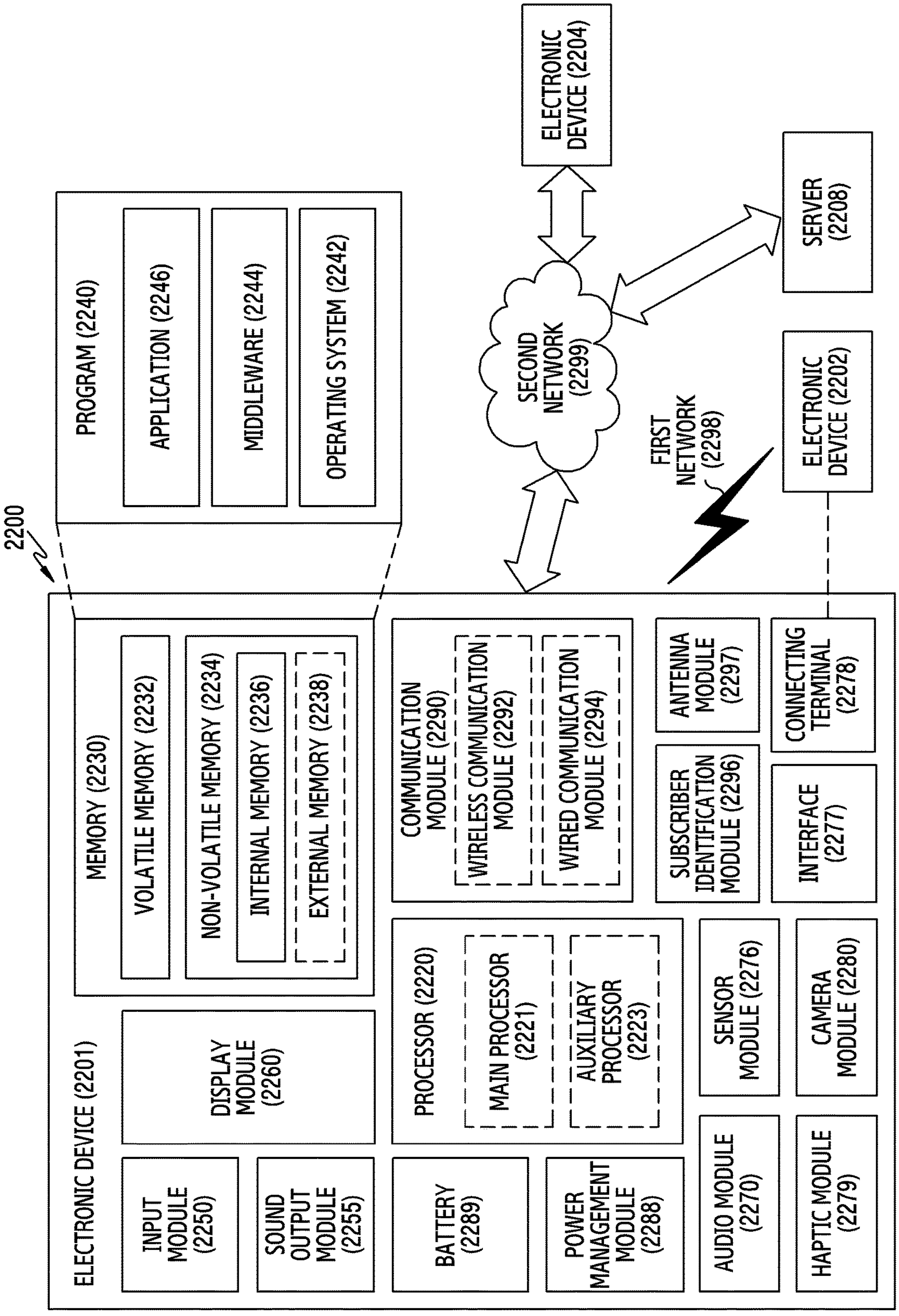
FIG. 22 is a block diagram of an electronic device in a network environment according to various embodiments.

FIG. 22 is a block diagram illustrating an electronic device 2201 in a network environment 2200 according to various embodiments. Referring to FIG. 22, the electronic device 2201 in the network environment 2200 may communicate with an electronic device 2202 via a first network 2298 (e.g., a short-range wireless communication network), or at least one of an electronic device 2204 or a server 2208 via a second network 2299 (e.g., a long-range wireless communication network). According to an embodiment, the electronic device 2201 may communicate with the electronic device 2204 via the server 2208. According to an embodiment, the electronic device 2201 may include a processor 2220, memory 2230, an input module 2250, a sound output module 2255, a display module 2260, an audio module 2270, a sensor module 2276, an interface 2277, a connecting terminal 2278, a haptic module 2279, a camera module 2280, a power management module 2288, a battery 2289, a communication module 2290, a subscriber identification module (SIM) 2296, or an antenna module 2297. In some embodiments, at least one of the components (e.g., the connecting terminal 2278) may be omitted from the electronic device 2201, or one or more other components may be added in the electronic device 2201. In some embodiments, some of the components (e.g., the sensor module 2276, the camera module 2280, or the antenna module 2297) may be implemented as a single component (e.g., the display module 2260).

The processor 2220 may execute, for example, software (e.g., a program 2240) to control at least one other component (e.g., a hardware or software component) of the electronic device 2201 coupled with the processor 2220, and may perform various data processing or computation. According to one embodiment, as at least part of the data processing or computation, the processor 2220 may store a command or data received from another component (e.g., the sensor module 2276 or the communication module 2290) in volatile memory 2232, process the command or the data stored in the volatile memory 2232, and store resulting data in non-volatile memory 2234. According to an embodiment, the processor 2220 may include a main processor 2221 (e.g., a central processing unit (CPU) or an application processor (AP)), or an auxiliary processor 2223 (e.g., a graphics processing unit (GPU), a neural processing unit (NPU), an image signal processor (ISP), a sensor hub processor, or a communication processor (CP)) that is operable independently from, or in conjunction with, the main processor 2221. For example, when the electronic device 2201 includes the main processor 2221 and the auxiliary processor 2223, the auxiliary processor 2223 may be adapted to consume less power than the main processor 2221, or to be specific to a specified function. The auxiliary processor 2223 may be implemented as separate from, or as part of the main processor 2221.

The auxiliary processor 2223 may control at least some of functions or states related to at least one component (e.g., the display module 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). According to an embodiment, the auxiliary processor 2223 (e.g., an image signal processor or a communication processor) may be implemented as part of another component (e.g., the camera module 2280 or the communication module 2290) functionally related to the auxiliary processor 2223. According to an embodiment, the auxiliary processor 2223 (e.g., the neural processing unit) may include a hardware structure specified for artificial intelligence model processing. An artificial intelligence model may be generated by machine learning. Such learning may be performed, e.g., by the electronic device 2201 where the artificial intelligence is performed or via a separate server (e.g., the server 2208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2230 may store various data used by at least one component (e.g., the processor 2220 or the sensor module 2276) of the electronic device 2201. The various data may include, for example, software (e.g., the program 2240) and input data or output data for a command related thererto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input module 2250 may receive a command or data to be used by another component (e.g., the processor 2220) of the electronic device 2201, from the outside (e.g., a user) of the electronic device 2201. The input module 2250 may include, for example, a microphone, a mouse, a keyboard, a key (e.g., a button), or a digital pen (e.g., a stylus pen).

The sound output module 2255 may output sound signals to the outside of the electronic device 2201. The sound output module 2255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2260 may visually provide information to the outside (e.g., a user) of the electronic device 2201. The display module 2260 may include, for example, a display, a hologram device, or a projector and control circuitry to control a corresponding one of the display, hologram device, and projector. According to an embodiment, the display module 2260 may include a touch sensor adapted to detect a touch, or a pressure sensor adapted to measure the intensity of force incurred by the touch.

The audio module 2270 may convert a sound into an electrical signal and vice versa. According to an embodiment, the audio module 2270 may obtain the sound via the input module 2250, or output the sound via the sound output module 2255 or a headphone of an external electronic device (e.g., an electronic device 2202) directly (e.g., wiredly) or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. According to an embodiment, the sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly (e.g., wiredly) or wirelessly. According to an embodiment, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to an embodiment, the connecting terminal 2278 may include, for example, a HDMI connector, a USB connector, a SD card connector, or an audio connector (e.g., a headphone connector).

The haptic module 2279 may convert an electrical signal into a mechanical stimulus (e.g., a vibration or a movement) or electrical stimulus which may be recognized by a user via his tactile sensation or kinesthetic sensation. According to an embodiment, the haptic module 2279 may include, for example, a motor, a piezoelectric element, or an electric stimulator.

The camera module 2280 may capture a still image or moving images. According to an embodiment, the camera module 2280 may include one or more lenses, image sensors, image signal processors, or flashes.

The power management module 2288 may manage power supplied to the electronic device 2201. According to one embodiment, the power management module 2288 may be implemented as at least part of, for example, a power management integrated circuit (PMIC).

The battery 2289 may supply power to at least one component of the electronic device 2201. According to an embodiment, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication. According to an embodiment, the communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device via the first network 2298 (e.g., a short-range communication network, such as Bluetooth™, wireless-fidelity (Wi-Fi) direct, or infrared data association (IrDA)) or the second network 2299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2292 may identify and authenticate the electronic device 2201 in a communication network, such as the first network 2298 or the second network 2299, using subscriber information (e.g., international mobile subscriber identity (IMSI)) stored in the subscriber identification module 2296.

The wireless communication module 2292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2292 may support a high-frequency band (e.g., the mmWave band) to achieve, e.g., a high data transmission rate. The wireless communication module 2292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2292 may support various requirements specified in the electronic device 2201, an external electronic device (e.g., the electronic device 2204), or a network system (e.g., the second network 2299). According to an embodiment, the wireless communication module 2292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2297 may transmit or receive a signal or power to or from the outside (e.g., the external electronic device) of the electronic device 2201. According to an embodiment, the antenna module 2297 may include an antenna including a radiating element composed of a conductive material or a conductive pattern formed in or on a substrate (e.g., a printed circuit board (PCB)). According to an embodiment, the antenna module 2297 may include a plurality of antennas (e.g., array antennas). In such a case, at least one antenna appropriate for a communication scheme used in the communication network, such as the first network 2298 or the second network 2299, may be selected, for example, by the communication module 2290 (e.g., the wireless communication module 2292) from the plurality of antennas. The signal or the power may then be transmitted or received between the communication module 2290 and the external electronic device via the selected at least one antenna. According to an embodiment, another component (e.g., a radio frequency integrated circuit (RFIC)) other than the radiating element may be additionally formed as part of the antenna module 2297.

According to various embodiments, the antenna module 2297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2201 and the external electronic device 2204 via the server 2208 coupled with the second network 2299. Each of the electronic devices 2202 or 2204 may be a device of a same type as, or a different type, from the electronic device 2201. According to an embodiment, all or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, mobile edge computing (MEC), or client-server computing technology may be used, for example. The electronic device 2201 may provide ultra low-latency services using, e.g., distributed computing or mobile edge computing. In another embodiment, the external electronic device 2204 may include an internet-of-things (IoT) device. The server 2208 may be an intelligent server using machine learning and/or a neural network. According to an embodiment, the external electronic device 2204 or the server 2208 may be included in the second network 2299. The electronic device 2201 may be applied to intelligent services (e.g., smart home, smart city, smart car, or healthcare) based on 5G communication technology or IoT-related technology.

According to various embodiments, there is provided an electronic device including: a first housing (e.g., 110 in FIG. 2); a second housing (e.g., 120 in FIG. 2) which is connected with the first housing through a connection member (e.g., 130 in FIG. 2) to be rotatable relative to the first housing; an opening (e.g., 221 in FIG. 4), which is formed along the third periphery; a switch (e.g., 224 in FIG. 4), which is disposed on a path which connects the opening and a ground region (e.g., G in FIG. 4); and a wireless communication circuit (e.g., 2292 in FIG. 22), which is disposed in the first housing or the second housing, where the first housing includes a first periphery extending in a first direction (e.g., +y direction) and a second periphery extending in a second direction (e.g., +x direction) which is perpendicular to the first direction, and the second housing includes a third periphery corresponding to the first periphery, and a fourth periphery corresponding to the second periphery when the first housing and the second housing face each other, a first region (e.g., a part of 140 in FIG. 3) of the first periphery and a second region (e.g., another part of 140 in FIG. 3) of the second periphery that is extended from the first region are formed of a conductive material, a first end (e.g., 141 in FIG. 3) of the conductive material is in contact with a first insulation member (e.g., 211-1 in FIG. 3) disposed on the first periphery, a second end (e.g., 142 in FIG. 3) of the conductive material is in contact with a second insulation member (e.g., 212-1 in FIG. 3) disposed on the second periphery, a first point (e.g., $P_1$ in FIG. 3) of the conductive material is connected with a power feeding path (e.g., 214 in FIG. 3), a second point (e.g., P2 in FIG. 3) of the conductive material is connected with a ground region (e.g., G in FIG. 3) in the first housing, wherein, when the first housing and the second housing face each other, a third insulation member (e.g., 222-1 in FIG. 4) and a fourth insulation member (e.g., 223-1 in FIG. 4) of the second housing are disposed on positions corresponding to the first insulation member of the first periphery and the second insulation member, respectively, and the wireless communication circuit is configured to: when the first housing and the second housing face each other, feed power to the conductive material through the power feeding path; and control the switch to electrically short-circuit the third periphery and the ground region.

According to an embodiment, when the wireless communication circuit controls the switch to electrically short-circuit the third periphery and the ground region, different currents generated adjacent to the opening may flow in a same direction.

According to an embodiment, the conductive material may operate as an antenna radiator in about 2.4 GHz.

According to an embodiment, when the first housing and the second housing do not face each other, the wireless communication circuit may feed power to the conductive material through the power feeding path, and may control the switch to electrically disconnect the third periphery and the ground region.

According to an embodiment, when the wireless communication circuit controls the switch to electrically disconnect the third periphery and the ground region, different currents generated adjacent to the opening may flow in opposite directions.

According to an embodiment, at least part of the second housing, which is defined by the third insulation member and the fourth insulation member, may operate as an antenna radiator.

According to an embodiment, the switch may be a first switch, and a first point of the antenna radiator may be connected with the ground region through a second switch, and a second point of the antenna radiator may be connected with the power feeding path in the second housing.

According to an embodiment, the antenna radiator may transmit and receive a signal of a lower frequency band than frequency band of a signal of the conductive material.

According to an embodiment, when the switch is in an ON state, the conductive material may generate a resonance which is independent from a resonance generated by the antenna radiator.

According to an embodiment, the first region of the first periphery in which the conductive material is formed, and the second region of the second periphery which is extended from the first region may be connected through a curved line.

According to an embodiment, a length of the first periphery may correspond to a width of the first housing in the first direction, a length of the second periphery may correspond to a width of the first housing in the second direction, and the first periphery may be longer than the second periphery.

According to an embodiment, t a length of the first periphery may correspond to a width of the first housing in the first direction, a length of the second periphery may correspond to a width of the first housing in the second direction, and the second periphery may be longer than the first periphery.

According to an embodiment, the opening may be filled with a material having a predetermined permittivity.

According to an embodiment, the first insulation member and/or the second insulation member may be formed of a high molecular compound having an insulation property, ceramic, a resin.

According to an embodiment, the opening may be formed along the third periphery and the fourth periphery.

According to various embodiments, there is provided an electronic device including: a first housing; a second housing which is connected with the first housing through a connection member to be rotatable relative to the first housing; an opening which is formed along the third periphery; a switch which is disposed on a path which connects the opening and a ground region; a wireless communication circuit which is disposed in the first housing or the second housing; and a flexible display which forms a front surface of the electronic device and is disposed over the first housing and the second housing, where the first housing includes a first periphery extending in a first direction and a second periphery extending in a second direction which is perpendicular to the first direction, and the second housing includes a third periphery corresponding to the first periphery, and a fourth periphery corresponding to the second periphery when the first housing and the second housing face each other; a first region of the first periphery and a second region of the second periphery that is extended from the first region are formed of a conductive material, a first end of the conductive material is in contact with a first insulation member disposed on the first periphery, a second end of the conductive material is in contact with a second insulation member disposed on the second periphery, a first point of the conductive material is connected with a power feeding path, a second point of the conductive material in the first housing is connected with a ground region, wherein, when the first housing and the second housing face each other, a third insulation member and a fourth insulation member of the second housing are disposed on positions corresponding to the first insulation member of the first periphery and the second insulation member, respectively, and the wireless communication circuit is configured to: when the first housing and the second housing face each other, feed power to the conductive material through the power feeding path; and control the switch to electrically short-circuit the third periphery and the ground region.

According to an embodiment, when the wireless communication circuit controls the switch to electrically short-circuit the third periphery and the ground region, different currents generated adjacent to the opening may flow in a same direction.

According to an embodiment, when the first housing and the second housing do not face each other, the wireless communication circuit may feed power to the conductive material through the power feeding path, and may control the switch to electrically disconnect the third periphery and the ground region.

According to an embodiment, when the wireless communication circuit controls the switch to electrically disconnect the third periphery and the ground region, different currents generated adjacent to the opening may flow in opposite directions.

According to an embodiment, at least part of the second housing, which is defined by the third insulation member and the fourth insulation member, may operate as an antenna radiator.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a first housing;

a second housing, which is connected with the first housing through a connection member to be rotatable relative to the first housing, wherein the first housing comprises a first periphery extending in a first direction and a second periphery extending in a second direction which is perpendicular to the first direction, the connection member extends in the second direction, and the second housing comprises a third periphery corresponding to the first periphery and a fourth periphery corresponding to the second periphery when the first housing and the second housing face each other;

an opening, which is formed along the third periphery in the second housing;

a wireless communication circuit, which is disposed in the first housing or the second housing, wherein a first region of the first periphery and a second region of the second periphery that is extended from the first region are formed of a conductive material, wherein a first end of the conductive material is in contact with a first insulation member disposed on the first periphery, wherein a second end of the conductive material is in contact with a second insulation member disposed on the second periphery, wherein a first point of the conductive material is connected with a power feeding path, wherein a second point of the conductive material is connected with a ground region of the first housing, wherein, when the first housing and the second housing face each other, a third insulation member and a fourth insulation member of the second housing are disposed on positions corresponding to the first insulation member and the second insulation member, respectively, and a floating conductive portion of the second housing is disposed on a position corresponding to the conductive material, wherein a first end of the floating conductive portion is in contact with the third insulation member, and a second end of the floating conductive portion is in contact with the fourth insulation member, wherein the third periphery includes a conductive portion extending from the connection member to the third insulation member in the first direction, the second housing further includes a switch, which is disposed in the opening and on a path which connects the conductive portion of the third periphery and a ground region of the second housing, and a first side of the opening is defined by the conductive portion of the third periphery, wherein the wireless communication circuit is configured to: when the first housing and the second housing face each other, feed power to the conductive material of the first housing through the power feeding path; and control the switch to electrically short-circuit the conductive portion of the third periphery and the ground region of the second housing such that both a first current flowing along the first side of the opening and a second current flowing along a second side of the opening opposite to the first side flow in a direction away from the connection member.

2. The electronic device of claim 1, wherein the conductive material operates as an antenna radiator in about 2.4 GHz.

3. The electronic device of claim 1, wherein the wireless communication circuit is configured to: when the first housing and the second housing do not face each other, feed power to the conductive material through the power feeding path; and control the switch to electrically disconnect the third periphery and the ground region.

4. The electronic device of claim 3, wherein, when the wireless communication circuit controls the switch to electrically disconnect the third periphery and the ground region, different currents generated adjacent to the opening flow in opposite directions.

5. The electronic device of claim 1, wherein at least part of the second housing, which is defined by the third insulation member and the fourth insulation member, operates as an antenna radiator.

6. The electronic device of claim 5, wherein the switch is a first switch, wherein a first point of the antenna radiator is connected with the ground region through a second switch, and wherein a second point of the antenna radiator is connected with a power feeding path in the second housing.

7. The electronic device of claim 5, wherein the antenna radiator is configured to transmit and receive a signal of a lower frequency band than a frequency band of a signal of the conductive material.

8. The electronic device of claim 5, wherein, when the switch is in an ON state, the conductive material is configured to generate a resonance which is independent from a resonance generated by the antenna radiator.

9. The electronic device of claim 1, wherein the first region of the first periphery in which the conductive material is formed, and the second region of the second periphery which is extended from the first region are connected through a curved line.

10. The electronic device of claim 1, wherein a length of the first periphery corresponds to a width of the first housing in the first direction, wherein a length of the second periphery corresponds to a width of the first housing in the second direction, and wherein the first periphery is longer than the second periphery.

11. The electronic device of claim 1, wherein a length of the first periphery corresponds to a width of the first housing in the first direction, wherein a length of the second periphery corresponds to a width of the first housing in the second direction, and wherein the second periphery is longer than the first periphery.

12. The electronic device of claim 1, wherein the opening is filled with a material having a predetermined permittivity.

13. The electronic device of claim 1, wherein the first insulation member and/or the second insulation member is formed of a high molecular compound having an insulation property, ceramic, a resin.

14. The electronic device of claim 1, wherein the opening is formed along the third periphery and the fourth periphery.

15. An electronic device comprising:

a first housing;

a second housing which is connected with the first housing through a connection member to be rotatable relative to the first housing, the first housing comprising a first periphery oriented in a first direction and a second periphery oriented in a second direction which is perpendicular to the first direction, the connection member extends in the second direction, the second housing comprising a third periphery corresponding to the first periphery and a fourth periphery corresponding to the second periphery when the first housing and the second housing face each other;

an opening which is formed along the third periphery in the second housing;

a wireless communication circuit which is disposed in the first housing or the second housing; and a flexible display which forms a front surface of the electronic device and is disposed over the first housing and the second housing, wherein a first region of the first periphery and a second region of the second periphery that is extended from the first region are formed with a conductive material, wherein a first end of the conductive material is in contact with a first insulation member disposed on the first periphery, wherein a second end of the conductive material is in contact with a second insulation member disposed on the second periphery, wherein a first point of the conductive material is connected with a power feeding point, wherein a second point of the conductive material is connected with a ground region of the first housing, wherein, when the first housing and the second housing face each other, a third insulation member and a fourth insulation member of the second housing are disposed on positions corresponding to the first insulation member of the first periphery and the second insulation member, respectively, and a floating conductive portion of the second housing is disposed on a position corresponding to the conductive material, wherein a first end of the floating conductive portion is in contact with the third insulation member, and a second end of the floating conductive portion is in contact with the fourth insulation member, wherein the third periphery includes a conductive portion extending from the connection member to the third insulation member in the first direction, the second housing further includes a switch, which is disposed in the opening and on a path which connects the conductive portion of the third periphery and a ground region of the second housing, and a first side of the opening is defined by the conductive portion of the third periphery, wherein the wireless communication circuit is configured to: when the first housing and the second housing face each other, feed power to the conductive material of the first housing through the power feeding point; and control the switch to electrically short-circuit the conductive portion of the third periphery and the ground region of the second housing such that both a first current flowing along the first side of the opening and a second current flowing along a second side of the opening opposite to the first side flow in a direction away from the connection member.

16. The electronic device of claim 15, wherein the wireless communication circuit is configured to: when the first housing and the second housing do not face each other, feed power to the conductive material through the power feeding point; and control the switch to electrically open the third periphery and the ground region.

17. The electronic device of claim 16, wherein, when the wireless communication circuit controls the switch to electrically open the third periphery and the ground region, flows of different currents generated adjacent to the opening are generated to be oriented in opposite directions.

18. The electronic device of claim 15, wherein at least part of the second housing that is defined by the third insulation member and the fourth insulation member operates as an antenna radiator.

* * * * *